United States Patent
Bridges

(10) Patent No.: US 12,067,892 B1
(45) Date of Patent: Aug. 20, 2024

(54) SYSTEM AND METHOD FOR VOCAL TRAINING

(71) Applicant: Emily Anna Bridges, Philadelphia, PA (US)

(72) Inventor: Emily Anna Bridges, Philadelphia, PA (US)

(73) Assignee: Academy of Voice LLC, Philadelphia, PA (US)

( * ) Notice: Subject to any disclaimer, the term of this patent is extended or adjusted under 35 U.S.C. 154(b) by 0 days.

(21) Appl. No.: 18/304,124

(22) Filed: Apr. 20, 2023

Related U.S. Application Data

(62) Division of application No. 16/835,176, filed on Mar. 30, 2020, now Pat. No. 11,640,767.

(60) Provisional application No. 62/825,271, filed on Mar. 28, 2019.

(51) Int. Cl.
*G09B 19/00* (2006.01)
*G09B 5/02* (2006.01)
*G10L 25/51* (2013.01)

(52) U.S. Cl.
CPC ............... *G09B 19/00* (2013.01); *G09B 5/02* (2013.01); *G10L 25/51* (2013.01)

(58) Field of Classification Search
CPC ... G09B 5/02; G09B 5/04; G09B 5/06; G09B 19/00; G09B 19/04; G10L 25/00; G10L 25/48; G10L 25/51; G10L 25/72
See application file for complete search history.

(56) References Cited

U.S. PATENT DOCUMENTS

| | | | |
|---|---|---|---|
| 6,728,680 B1 | 4/2004 | Aaron | |
| 9,344,821 B2 | 5/2016 | Emory | |
| 11,640,767 B1* | 5/2023 | Bridges | G09B 5/02 |
| | | | 434/257 |
| 2003/0182111 A1 | 9/2003 | Handal | |
| 2005/0252362 A1 | 11/2005 | McHale | |
| 2005/0255914 A1 | 11/2005 | McHale | |
| 2005/0262989 A1* | 12/2005 | Franzblau | G09B 15/023 |
| | | | 84/470 R |
| 2006/0009979 A1 | 1/2006 | McHale | |
| 2011/0003638 A1 | 1/2011 | Lee | |
| 2014/0116231 A1 | 5/2014 | Leflore | |
| 2014/0356822 A1 | 12/2014 | Hoque | |
| 2015/0269857 A1 | 9/2015 | Feng | |

(Continued)

*Primary Examiner* — Milap Shah
(74) *Attorney, Agent, or Firm* — Axenfeld Law Group, LLC; Robert R. Axenfeld

(57) ABSTRACT

A computer-implemented system and method for vocal training. A user's voice is measured and assessed. Personalized attributes about the user are also acquired including goals of the user. Based on measured aspects of a user's voice, and attributes acquired about the user (based on a combination of user-reported data, mechanically-assessed and/or artificial intelligence-determined analysis), (1) a report is generated about the user's vocal quality and ability, and (2) the user is given individualized feedback, lessons, and vocal exercises specific to the user's voice, vocal ability, voice-comfort-zone boundaries, and the user's goals in a scientific manner in the form of a virtual-vocal coach. The techniques and goals may be given to the user in real time, and/or used to generate new exercises and drills. By constantly measuring and scoring a user's progress, an ongoing-overall-voice strategy is generated to help the user meet the user's ongoing vocal-development goals.

6 Claims, 7 Drawing Sheets

(56) References Cited

U.S. PATENT DOCUMENTS

| | | |
|---|---|---|
| 2016/0049094 A1 | 2/2016 | Gupta |
| 2016/0253923 A1 | 9/2016 | Yang |
| 2018/0350389 A1 | 12/2018 | Garrido |
| 2019/0124441 A1 | 4/2019 | Dong |
| 2019/0139437 A1 | 5/2019 | Goren |
| 2019/0139447 A1 | 5/2019 | Crawford |
| 2019/0266914 A1 * | 8/2019 | Perez |
| 2020/0135237 A1 * | 4/2020 | Gauvin ................ G11B 27/036 |

* cited by examiner

SYSTEM AND METHOD FOR VOCAL TRAINING

CROSS-REFERENCE TO RELATED APPLICATIONS

This application is a divisional from U.S. Patent application Ser. No. 16/835,176, entitled "System and Method for Vocal Training", filed Mar. 30, 2020, and claims the benefit of U.S. Provisional Patent Application Ser. No. 62/825,271, entitled "System and Method for Vocal Training" filed Mar. 28, 2019, the entireties of which are hereby incorporated by reference.

COPYRIGHT NOTICE

This patent document contains material that is subject to copyright protection. The copyright owner has no objection to the reproduction of this patent document or related materials as they appear in the files of the U.S Patent & Trademark Office, but otherwise reserves all other intellectual property rights including copyrights.

BACKGROUND OF THE INVENTION

Traditionally, the best way for a singer or public speaker to improve his voice was to hire a vocal coach to provide voice lessons and individualized feedback. However, a singer or speaker may want to train his voice without the help of a vocal coach.

Further, traditional-vocal coaches are often difficult for amateur singers or speakers to find, especially outside of urban environments. Vocal coaches are often expensive, and their time is limited. Additionally, vocal coaches can vary greatly in quality—many of whom often lack a repeatable scientific system to ensure vocal progress. Therefore, a singer or speaker may desire to take lessons online, through an app, or use a vocal-training device at home.

However, there are challenges for a singer or speaker to improve their vocal quality through current apps and online tools, such as YouTube videos, and DVDs. For example, current online tools for singing and speaking improvement are often not able to access the user's voice and offer customizable vocal training tailored for the user. Additionally, there are products that claim to be a "virtual voice coach," such as a mechanical-ear-style-pitch trainer, warm-up and exercise generator, or other singing apps. Although these apps may help beginning users achieve better pitch, some limited range expansion, or to warm up, these apps are limited in scope and usually are only effective, if the user already understands his voice and how to effectively use these products (such as to warm up).

In addition, these tools and products are commonly unable to measure and assess many of the aspects of a singer's or speaker's voice that a vocal coach would assess such as tessitura, vocal quality, or stamina. Also, these tools and products do not understand the goals of the singer or speaker. This means that these tools and products cannot provide a singer or speaker with individualized feedback, lessons, and vocal exercises specific to the singer's or speaker's voice, vocal ability, and goals in a manner like that of a vocal coach.

Accordingly, there is a continuing need for improved online or automated voice-coaching systems that actually accesses each user's voice and other attributes associated with the user, and based on the assessment and the user's attributes, offer the user voice-coaching lessons in a manner that a professional-human-voice coach would offer their understudies, i.e., lessons that are specifically tailored to each user's individual qualities, and needs.

SUMMARY OF THE INVENTION

Described is a computer-implemented system and method for vocal training. In one aspect, a system measures and assesses many aspects of a singer's or speaker's voice such as tessitura, vocal quality, or stamina. The system also learns personalized attributes about the user, such as the age, gender, experience level, and goals of the singer or speaker. Based on measured aspects of a user's voice, and attributes about the user, the system is able generate a report of the user's vocal quality and ability, and then provide a singer or speaker with individualized feedback, lessons, and vocal exercises specific to the singer's or speaker's voice, vocal ability, and goals in a manner similar to that of a vocal coach.

In another aspect, a user's voice is measured and assessed. Personalized attributes about the user are also acquired, such as age, gender, experience level, and/or goals of the user. Based on measured aspects of a user's voice, and attributes acquired about the user (1) a report is generated about the user's vocal quality and ability, and (2) the user is given individualized feedback, lessons, and vocal exercises specific to the user's voice, vocal ability, voice-comfort-zone boundaries, and the user's goals in a scientific manner in the form of a virtual-vocal coach. In other words, based on a combination of user-reported data, mechanically-assessed and/or artificial-intelligence-determined analysis, the user is provided with feedback on techniques and goals. The techniques and goals may be given in real time, or prioritized and used to generate ongoing new lessons and drills. The user is constantly scored and monitored to help measure the user's progress, which forms the basis of generating an ongoing overall strategy for helping the user meet ongoing vocal-development goals.

For instance, a user may submit to the system attributes about the user, including one or more of the following: the user's age; gender; vocal interests; the user's vocal health (including current problems that may impinge the user's voice and duration of the problems); and a vocal history of the user measured by various milestones on a timeline, such as how many years the user sang in a school or religious choir, or instruments the user may have studied, and for how many years.

The user may also submit one or more vocal samples to the system. For example, the system may collect a vocal sample from the user by presenting the user with a singing exercise, or speech and then records the user's voice while the user performs the singing exercise or speech exercise. The system may also collect a vocal sample previously uploaded by the user from one or more prior-audio sessions.

Alternatively, the system may analyze voice data and provide feedback to the user in real-time as the user provides his or her vocal input. For instance, the system may receive audio and/or video data representing an audio-visual input of a user performing a vocal exercise. The system analyzes audio-visual data, based at least in part, upon artificial-intelligence ("AI"). And based on the analysis, the system may detect the user's highest-comfortable-vocal range and the user's lowest-comfortable-vocal range while the user performs the vocal exercise.

The user's highest-comfortable-vocal range generally represents a highest-vocal boundary, in which the user can comfortably sing or speak. Conversely, a lowest-comfortable-vocal range generally represents the lowest-vocal boundary of the user, in which the user can comfortably sing or speak. The user's highest-comfortable-vocal range is typically below the user's highest-achievable-vocal range, and the user's lowest-comfortable-vocal range is typically above the user's lowest-achievable-vocal range.

The system may also collect subjective feedback from the user (with or without AI analysis and detection), such as how comfortable a user felt singing certain notes, or how comfortable the user felt pronouncing certain words. Subjective feedback may be collected by asking the user a series of questions about the user's performance during the singing exercise or sample speech.

The system then analyzes all the collected information—such as the submitted attributes, vocal samples, the subjective feedback, and possibly information stored about the user from prior exercises/sessions stored on the system—and generates a vocal profile about the user, which the system may display to the user in the form of a vocal-profile report.

Based on the generated vocal profile about the user, the system uses development engine to retrieve and present the user with a series of voice lessons tailored specifically to the user. These voice lessons can take numerous forms including but not limited to practice-singing exercises, videos, quizzes, activities, and other customized-educational experiences; again based on the user's unique vocal profile.

Additionally, based on the generated vocal profile about the user the system may also generate or compile songs or activities which are customized to enrich the vocal-training progress of the user and provide coaching to the user on her vocal development through customized coursework, customized exercises, including longer training exercises and shorter customized drills, or direct feedback.

Through the ongoing collection of data from the user throughout the training process the vocal-development engine may also continuously track the user's progress and vocal-development level. The vocal development engine uses numerous sources of information to determine a user's vocal-development level (i.e., a vocal profile) including but not limited to user reported data and external data, data analyzed by an external mechanical device, data analyzed by a human expert, or AI scoring coupled with algorithmic logic. Using this, the system may provide questionnaires, lessons, materials, songs, assignments, custom coaching sessions, custom exercises, custom drills, custom activities and personalized feedback with examples of the user's own singing to help the user progress to higher levels of vocal development.

There are several ways by which a user may interact with the system. In one embodiment, the user interacts with the system by using a computer on the internet, answer by typing, mouse clicks, or with voice recognition software questions about vocal background and goals, sing along with audio or video vocal assessments (real-time or recorded), and report information regarding absolute and usable range, vocal comfortability, vocal quality and other human factors.

In another embodiment, the user can review a vocal report about his or her voice by exploring such personalized aspects such as experience level, comparison with celebrities with similar voices, ranges or styles, appropriate gender and age-related vocal challenges being presently faced, full vocal profile with range and register data points mapped out as notes on staff paper with description and instructions on how to make the most of the current usable range, a map of present vocal qualities identifying areas for growth and specific goals for the user based on her current vocal performance and self-reported data.

Updates to this report may include further information about the initially measured areas, including one or more vocal-profile parameters, as well as reporting progress and directives. For example, the directives may include suggestions as to: posture (tension levels), breathing (inhaled and exhaled), vocal adduction, tessitura, usable range expansion, pitch accuracy, use of consistently resonant vowel sounds in performances of songs, expressivity, song interpretation, stylistic elements, and performance techniques, etc.

If the user is looking for help with her voice for speaking, this report may also include speech-specific information, such as progress reports, analysis, and directives about the user's voice, based on such factors as: measurement and analysis of spoken pitch, adduction levels, the presence of emphasis, resonance, volume fluctuations, rhythm, and tonal support, for example.

In yet another aspect, a system or method may help a speaker improve his or her speaking voice by showing the user how to modulate the voice, including the underlying fundamental abilities of the voice in question. For instance, the system and method may suggest that the user vary vocal pitch (for added energy), vary pitch, length or loudness to create emphasis, or to go down in pitch at the end of a sentence, for example, to create more confident speech patterns.

Additionally, if a speaker desires to strengthen a weak-speaking voice, expand the resonance or clarity of the voice, or give the voice more stamina to speak for longer times, this is deeper, more specialized work that the present invention may address. All of the same targeted exercises that help singers reach new notes and develop the intensity and stamina of the speaking voice will also bring the same qualities to the spoken voice. In this case, an embodiment of the system and method may use its multiple data streams and programs to determine that a speaker requires lessons with specific breathing and phonation-focused exercises, which can be produced by the system and presented to the speaker along with more simple modulation-type speech instruction.

In yet another aspect, a user can use a large-screen television with internet capability to watch video voice lessons chosen for the user based on what the user has already learned, still needs to learn, and where her vocal development is determined to be, as measured by her vocal assessments, lessons, vocal training practices, coaching sessions or performances with the system. Lessons may or may not include conventional written, audio, video, VR or other means of consuming lectures, readings, graphics, in-depth information about the aspect of the voice being learned, specifics on how to achieve specific goals while doing an exercise, preparing a song, learning a technique, or training the voice.

In another aspect, a user can also interact with the system via a cell phone application. There, a user can practice vocal training exercises, drills, activities and songs customized to the voice's abilities, experience level, and usable range, whose content, order of presentation, as well as timing of presentation are based upon the user's recent experiences, concerns and interests, or the learning style of the user, such that the user remains motivated to practice and work on her vocal training.

In a virtual-reality environment, a user can receive feedback on her recent practice progress, including example clips of the user demonstrating aspects of said feedback, and obtain specific coaching instructions to complete customized activities, drills, or exercises, including demos, that will support said user's continued vocal development with that song, and overall.

On a desktop computer, a user can submit a recording of the user attempting a song he or she is interested in, and receive advice about whether to begin working on the song at this point, and if so, what key the song might be attempted in and where that version of the song may be obtained. Alternatively, if the system determines the song is too difficult, based on the vocal ability of the user, the system may suggest that the user stores the song for future use. The system may then make that song one of this user's personal vocal-development goals and create specific exercises to help the user achieve the appropriate vocal-development level from which to begin working on the song.

This summary is provided to introduce a selection of concepts in a simplified form that are further described below. This summary is not necessarily intended to identify key features or essential features of the claimed subject matter, nor is it necessarily intended to be used as an aid in determining the scope of the claimed subject matter.

The foregoing outlines examples of this disclosure so that those skilled in the relevant art may better understand the detailed description that follows. Additional embodiments and details will be described hereinafter. Those skilled in the relevant art should appreciate that they can readily use any of these disclosed embodiments as a basis for designing or modifying other structures or functions for carrying out the invention, without departing from the spirit and scope of the invention.

Reference herein to "one embodiment," "an embodiment," "an aspect," "an implementation," "an example," or similar formulations, means that a particular feature, structure, operation, or characteristic described in connection with the embodiment is included in at least one embodiment of the present invention. Thus, different appearances of such phrases or formulations herein do not necessarily refer to the same embodiment. Furthermore, various particular features, structures, operations, or characteristics may be combined in any suitable manner in one or more embodiments.

BRIEF DESCRIPTION OF DRAWINGS

The detailed description is described with reference to the accompanying figures. In the figures, the left-most digit(s) of a reference number identifies the figure in which the reference number first appears. The figures are not necessarily drawn to scale.

DETAILED DESCRIPTION OF THE INVENTION

Introduction

Figure 1:
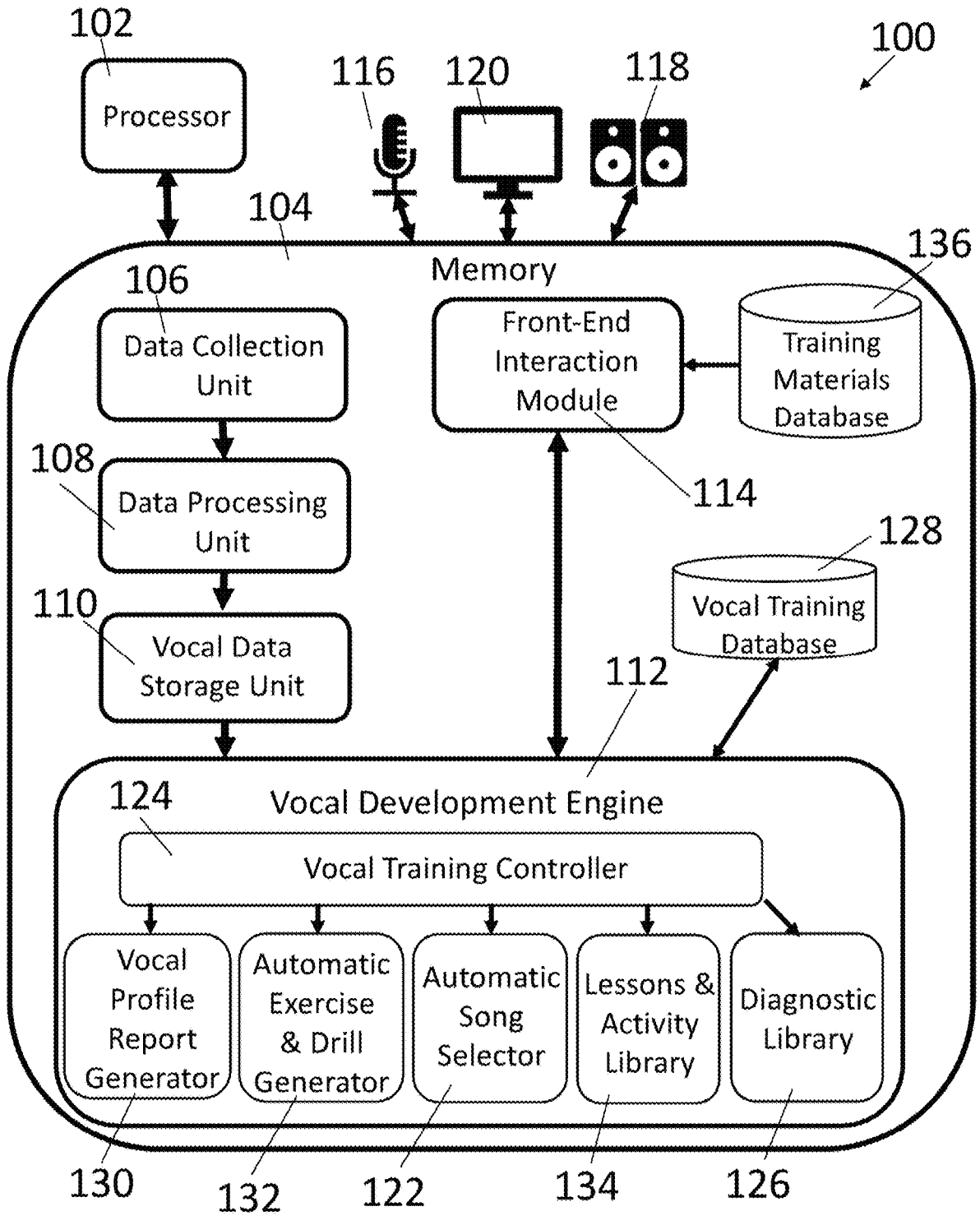
FIG. 1 shows diagram of an embodiment of the system's components and relations between those components.

Automated voice training coaches are limited today. It is not believed that any options available today consider vital human factors such as: comfortability vocalizing (tessitura), level of adduction achieved (core vocal strength), or usable range (vocal comfort zone) for diagnosing and training the voice the same way that an expert vocal coach might. They also do not employ artificial intelligence technology, which can tackle more complex issues, such as vocal adduction, issues with bodily tension affecting vocal production, or vowel formation.

Although artificial intelligence and deep learning are being developed, as of yet, this technology has not been harnessed in an advanced-vocal-training platform for a full-spectrum of singing, or speech. These existing methods of training the voice are thus still quite limited in their ability to achieve improved vocal performance with users in need of more in-depth vocal work.

While some existing tools measure a user's highest and lowest notes, as well as vocal intensity via a mechanical means, none measure the usable range (i.e., a highest and lowest notes that can be produced with enough quality to use in performance) or tessitura (i.e., an area of the voice where it feels most comfortable to sing) of the voice with input from the user as to what he or she feels in a particular vocal range. Today, purely mechanical algorithms do not generate exercises for a user.

Thus, pre-existing mechanical systems and other algorithmic methods also lack a way to automatically generate exercises for aspiring users that start within the unique voice's comfort zone and then challenge the user to expand and strengthen upon the usable range.

A user may want to learn more about his own voice, train with materials that are more appropriate to his own vocal-experience level, work with vocal-training exercises that fit his own usable range as well as match a host of other personalized factors. For instance, a user may want to train with vocal exercises that start in a comfortable area of his own vocal range, and then become increasingly challenging, allowing the usable areas of the vocal range to be expanded and strengthened.

A user may also want to better achieve adduction of his vocal cords to achieve a clearer, more intense, and healthier way of singing or speaking at the core of the user's sound. A user may also want to work with songs that fits the user's usable range well and challenge the user appropriately according to the user's experience level. Finally, users may want to work on personalized and customized songs, speeches and activities that help to develop the user's own unique vocal skills in a targeted way, train in a way that matches and suits the user's stylistic interests, and receive feedback on recent or real-time performances of songs in the form of expert-human or AI-assisted vocal coaching.

A user may also not know what it is that he needs on a given day to have a good practice, balancing progress in his vocal development with motivation to train. For example, when a user is experiencing low-on-energy, or feeling unusual stress at a given time and the user tries to learn new songs or attempt new exercises he can become easily discouraged and lose motivation to keep training. A live in-person-vocal coach may check-in with a user as a lesson begins, to gauge the user's frustration, energy, and interest level on that given day. If a user is having an extra difficult day, for example, with low energy and interest coupled with high stress, a vocal coach might ask the user to review skills that are known strengths for the user, and then work on songs the user enjoys and feels competent with. When a user arrives with high energy and low frustration, the coach may present the user with new materials and more challenging songs or more involved lessons and longer coaching sessions.

Additionally, a singer or speaker may want to train her voice with or without the help of a vocal-training expert. Traditional voice teachers are often difficult to access outside urban environments or by amateur users, and often lack a repeatable scientific system to ensure vocal progress.

Thus, a singer or speaker may want to take lessons online or through an app, or virtual reality portal, and not work in the traditional way, one-on-one in the physical presence of a vocal training teacher. The singer or speaker may want the added convenience to train his voice at home, in the car, or at the office, or a remote location.

Accordingly, described herein is an innovative computer-implemented system and method for improving vocal singing and spoken vocal training. Some aspects of the innovative system and method may be described with reference to example FIGS. 1 through 6. As used herein, the term "user" means a person who interacts with the example systems and methods described herein. Further, the user may be a singer, a speaker, or someone attempting to improve both his, or her singing and speaking ability. As appreciated by those skilled in the art, the pronoun, "he" or "she" is not meant to restrict use of the invention to any specific gender and may be used interchangeability unless gender is used to describe a trait associated more predominantly with a male or female voice.

FIG. 1 shows selected functional components of system 100 for facilitating vocal singing and spoken-vocal training. System 100 includes a processor 102 and memory 104. Processor 102 may be implemented as any form of processing component, including a microprocessor, control logic, application-specific integrated circuit, and the like. Memory 104 may include computer-readable storage media ("CRSM"), which may be any available physical media accessible by processor 102 to execute instructions stored on the memory. In one embodiment of system 100, CRSM may include random access memory ("RAM") and Flash memory. In another embodiment of system 100, CRSM may include, but is not limited to, read-only memory ("ROM"), electrically erasable programmable read-only memory ("EEPROM"), or any other medium which can be used to store the desired information and which can be accessed by processor 102.

Several modules such as instruction, datastores, and so forth may be stored within memory 104 and configured to execute on processor 102.

Such modules include but are not limited to a data collection unit 106, a data processing unit 108, a vocal data storage unit 110, a vocal development engine 112, and a front-end interaction module 114.

System 100 may operate and behave as if it is a human-vocal coach. For instance, when a singer or speaker (i.e., a user) trains his or her voice in the context of an in-person-vocal-learning environment, a human-vocal coach receives a continuous stream of data from the user from the moment the singer or speaker walks into the coach's studio. In addition to hearing progress in vocal development based on the singer's or speaker's performances of exercises and songs, the user might also report his overall stress level, problems the user may have faced with training practices at a certain point in or throughout the week, breakthroughs the user had in the user's vocal training, questions that have arisen in the user's training process, or specific areas of songs the user is having trouble with. All of this data may elucidate for an expert-vocal coach, specific modes of action and strategies to take with the singer's or speaker's vocal development.

In one embodiment of system 100, data collection unit 106 collates the multiple data streams submitted by the user including self-assessed and external data and puts that data in a format readable by data processing unit 108. This data is then fed back into data processing unit 108 to be analyzed, scored and assessed, and stored in vocal data storage unit 110, where various scores for ongoing vocal development is recorded. Based on these scores, system 100 will offer a user exercises and corresponding teaching materials applicable to her vocal-development level, which is determined by vocal-development engine 112. Any areas of vocal development found lacking by engine 112 are keyed for more training by the user in those areas that need work, before allowing the user to advance to the next level of development. A user may or may not be made aware all aspects of system 100's determination of a user's vocal development level or goals in order to create and maintain a high level of motivation on the part of the user. Each of these interactions with the user are moderated for audio and/or visual presentation to the user through front-end interaction module 114.

In one embodiment of system 100, the operations of data collection unit 106, data processing unit 108, vocal data storage unit 110, vocal development engine 112, and front-end interaction module 114 are implemented as software. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Generally, each element of system 100 may be implemented as an app, software-as-a-service, or a standalone device that includes functional capabilities with input/output components (such as a microphone(s) 116, speaker(s) 118, a display(s) 120, or a keyboard (not shown) connected directly or indirectly to front-end interaction module 114), memory implemented local or remotely (such as denoted as vocal-data storage unit 110, vocal-training database 128, and database 136, and processing capabilities (such as denoted as data processing unit 108) all implemented locally or remotely, as well as in in hardware, firmware, software, or any combination thereof. As appreciated by those skilled in the art, system 100 may rely on well-known hardware devices not shown including a touchscreen to facilitate presentation and user input, a keyboard or keypad, and power supplies. System 100 will now be described in greater detail below.

One of the most difficult parts of training voices without the physical presence of a human-singing expert observing the session is the lack of multiple streams of data. Current apps and programs, if they do use data collected from the user, receive only simple choices, such as the choice between "Alto" or "Soprano" to complete vocal exercises, for example. A user may be offered a simple menu of programs to choose from, but the content is not personalized just for the user's voice. Likewise, mechanical ear-style pitch analyzer technology relies on real-time audio. This is helpful for very basic skills like producing a sound that is matching a specific frequency (singing on tune), for example. However, there is a deeper layer of vocal training available to the user if the data streams are expanded to take into account the human experience using an approach that adapts in real time to the current health, mood, skill and capabilities of the user as set forth, at least in part, in the following paragraphs.

When a singer or speaker comes to a real in-person voice lesson, the singer or speaker brings his or her experience, interests, preferences, and goals, in addition to his or her actual voice.

In a voice lesson, only a small percentage of the time may be spent singing. A teacher is collecting all sorts of data from the student, and then doing a lot of processing of that data against previous teaching experiences, as well as against this particular student's vocal development over time, so she knows what to prescribe for the user as the user trains. While some of the material is the same for all singers or speakers, much of what is taught is specific to the student's progress, interests, learning style, abilities, skill level, and developing vocal needs.

System 100 has multiple data streams collected from the user by data collection unit 106. The first type of data is user-reported. For instance, to be able to provide the user a quality vocal training experience, system 100 collects data (in this case attributes about the user) which may include but is not necessarily limited to the user's: age; gender; vocal interests such as style preferences and areas of study; vocal history as measured by various types of experiences on a timeline, such as how many years singing in school or church choir or how many instruments have been studied for how many years.

Other data collected by data unit 106 may also include a vocal health history of the user, such as problems currently being experienced by a user's voice, along with frequency and extent of a user's training. These may be collected via a series of questions propounded on the user via front-end-interaction module 114.

Figure 2:
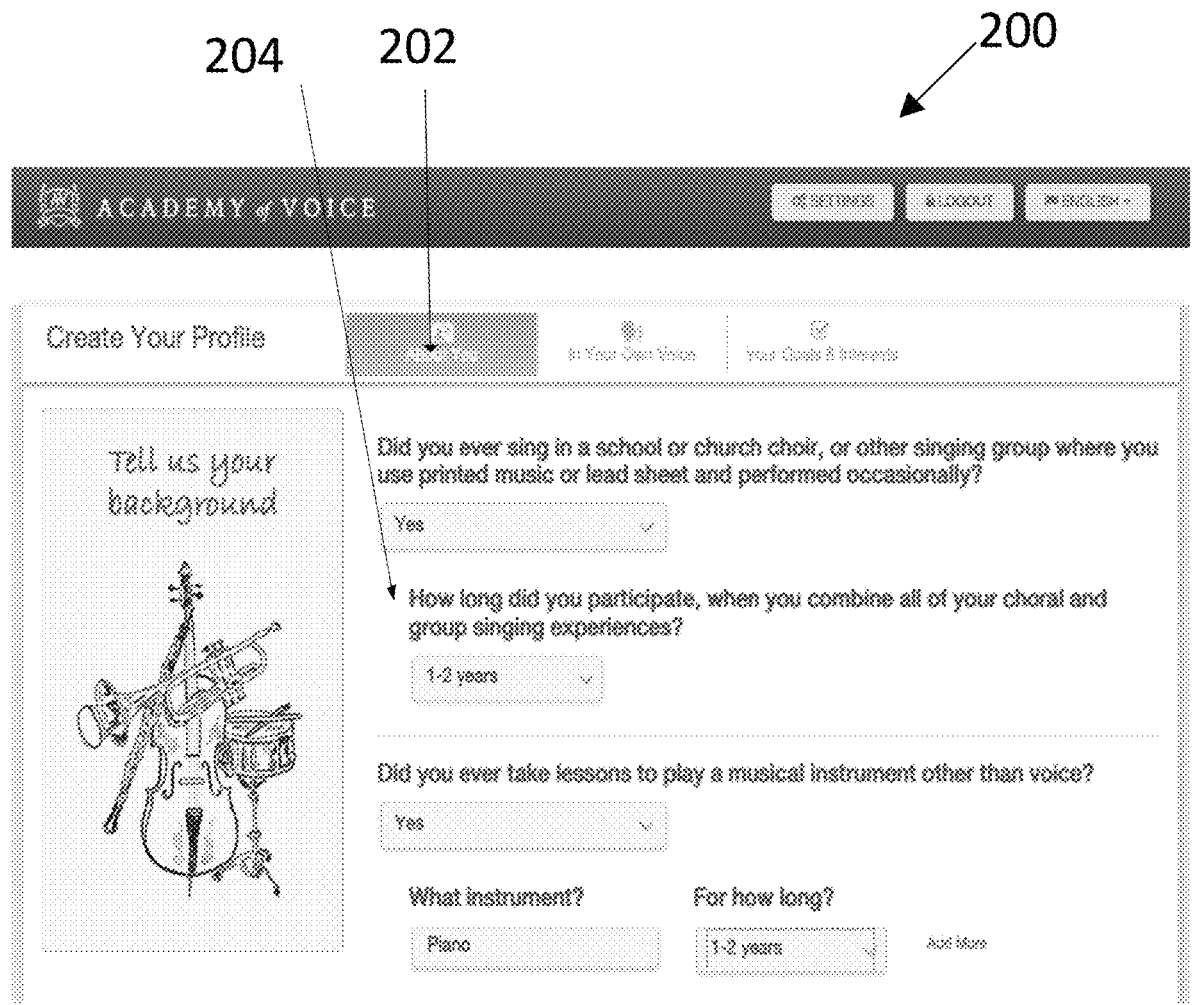
FIG. 2 depicts an embodiment of a user interface for entering user-reported data.

For example, FIG. 2 shows a sample screenshot of a user interface 200 for collecting attributes about the user. In this example, user interface 200 includes a question section 202 asking the user to submit information about her previous singing experience, such as "How long did you participate, when you combine all of your choral and group singing experience?" User interface 200 also includes another question section 204, asking the user to submit information about her previous experience playing musical instruments.

In addition to attributes about the user submitted to system 100, data collection unit 106 may prompt the user to submit voice specimens to system 100 for analysis. For example, data collection unit 106 may collect points (i.e., singing or speaking notes), which measure the range-register aspect of the user's vocal profile, taking into account the user's experience producing the notes in a range. Receiving feedback from the user about what notes he or she can comfortably produce is vital to diagnosing the current state of the voice and producing exercises and training materials for that voice. For instance, users can feel the places where the voice becomes stronger, weaker, breaks from one register to another (like the changing of gears) and this information is helpful to fit the voice with exercises that begin in the comfort zone and then challenge the voice to expand that comfortable area into what started out as only potential or absolute range.

System 100 elicits and collects multiple data streams from the user through front-end interaction module 114. For example, it can request the singer to perform initial vocal exercises such as a humming exercise or by asking the singer to sing a specific note. System 100 may then record the user's performance of that exercise as an audio file and/or ask the user about the user's performance with a series of questions to collect user experience information.

In one embodiment, system 100 presents a user with real-time feedback of the user's vocal pitch over time as the user records or as the user listens to a recording of herself vocalizing. This may allow a speaker to find her best speaking pitch in real time and attempt to move the baseline of her speaking pitch to an optimal level as directed by system 100. For a singer this should assist her with singing more on pitch. The system may analyze other voice data in addition to pitch, and provide feedback to the user in real-time as the user provides her vocal input.

The user-reported data collection process differs for various types of users due to gender and experience levels as data points of various vocal profiles differ with these variables. For example, a male voice has a falsetto register while most female voices, due to their smaller size, do not. So, the data points collected about a male voice are different than the female voice. Another example is an advanced female voice verses a beginner female voice, where the advanced user is able to feel the difference between her head and chest registers and able to control which one she uses for various notes. Her experience navigating that transition area can be reported, but a beginning female may or may not be able to feel just the one note where the shift from one register to another occurs. So, her data points reflect the experience she is able to perceive.

System 100 provides a framework for user-reported data collection to assist users in making accurate determinations about the comfort zone of the vocal range. In order to support the user in making these decisions, there may be coaching videos to teach a singing pattern, explain the area of the voice being measured, and explicitly educate the user on how to measure the data by describing and giving examples.

This vocal range and quality information, in particular, can also be made more accurate by giving the user access to mechanical tools that aid in reading the voice correctly, such as commonly used visual pitch detection and intensity detection software to help the user collect this data in the most accurate way. AI technology may also be used in this context to aid the user in self-reporting data about the user's vocal range and quality.

Ultimately, however, it is necessary for system 100 that self-reported data be collected such that the user's experience while singing or speaking is taken into account for the purposes of measuring the voice, measuring the progress of training, creating personalized training exercises, choosing songs, and generating appropriate coaching activities for the user.

As the user progresses, system 100 continuously collects new range-register vocal profile information, including all previously described data points used to describe usable range, absolute range, and transition areas of the voice.

Other data which may continue to be collected in this user-reported stream may be vocal quality information, such as what it feels like to sing in various areas of the vocal range, perceived vocal challenges, and the goals the user would like to achieve for each area of said range. In another embodiment of system 100, a user also reports vocal health issues as they arise, the user's ongoing levels of stress, frustrations with practice, inspirations and ideas for future training, changes in motivation levels, concerns about the user's voice and singing in general and questions the user might have regarding his training, his voice, or any courses used in conjunction with system 100.

Other forms of user-reported data include answers to prompts by system 100 collected during lessons, practices, coaching sessions, conversations with system 100. For example, when a user begins her practice, system 100 checks in with her about how life is going in general, how she feels about her singing and her recent practices. Lessons take her stress, frustration and motivation levels into account. In addition, if a user is sick, system 100 will give her a very different kind of practice that does not require much intense vocal usage and will check in with her more frequently in the days following the illness as she trains for signs of vocal pain, fatigue or strain and stop the practice short if any of these are present. The user is given only the level of vocalization that the user feels comfortable handling and will be given specific exercises that help in vocal recovery as the user is ready.

In another embodiment of system 100, user-reported data takes the form of written, typed, voice-recognized audio, video and VR files or formats. User-reported data may be taken at any time, with questionnaires, in lessons, quizzes, conversations with a human or AI coach, as annotations on practices, coaching sessions or performances with system 100.

As used in this detailed description and claims, the term "video" may include any form of moving visual media, and other forms of visual and non-visual energy scanning, detection and/or sensing, such as light emitter(s) and light detector(s), infrared light emitter and/or detector, energy-scanning sensor(s) such as for detecting energy emitted by a user based on other forms of energy such as electrical-neurological activity, LIDAR emitter/scanner, and other related energy-emitting and/or energy-detecting, scanning, or sensing devices suitable for use in association with system 100, as would be appreciated by those skilled in the art after having the benefit of this disclosure.

Data is collected either as the user interacts with front-end interaction module 114 or is uploaded to a temporary database that can be scanned as part of front-end interaction module 114.

In yet another embodiment, system 100 collects external data which are external to the experience of the user and include ways of capturing light and sound reflected or produced by the user. This data can be collected through numerous means including but not limited to microphones, cameras, video, VR, 3D scanners, doppler, seismograph, laser, scatter, sonar, MRI or other technologies that visualize air pressure, vibrations, sound, posture, facial or body motions, or any other visual or auditory aspect of the user's performance. These visual-auditory and other external data are then analyzed for both mechanical as well as expert-human or artificial intelligence scores on various elements in order to process these data. Referring to FIG. 1, after data has been collected by data collection unit 106, system 100 transfers that data to data processing unit 108. Before, analyzing the data, data processing unit 108 first performs some preprocessing tasks on the data depending on the type of the data.

Because user-reported data may be prone to incompleteness or errors, and because users may feel uncomfortable using materials generated from incorrect or incomplete data, system 100 is equipped, in one embodiment, with ways to correct user-reported data. In conjunction with other data sources, system 100 uses algorithms to check user-reported data for errors and notify the user during the collection process of any suspected errors and how to correct them.

In the event that user-reported data is incomplete, system 100 uses algorithms to attempt to extrapolate the missing data from all data sources system 100 has access.

In an embodiment of system 100, user-reported range-register vocal profile data is entered by the user when prompted by front-end interaction module 114. It is double-checked by algorithms for errors as it is entered. Some of the data is processed within data processing unit 108 using algorithms which give scores for various vocal parameters.

In another embodiment, system 100 uses an artificial intelligence data processing unit to analyze more complicated aspects of vocal production such as posture, proper breathing, proper adduction of the vocal cords to produce the core sound of the voice, vocal health, vowel shaping, resonance, song interpretation, emotional expression, emphasis, pitch modulation, going down on ends of sentences to signal certainty and other performance techniques. In an alternate embodiment, system 100 uses an outside expert human to perform this task.

For example, the artificial intelligence data processing unit scores the user's vowel production during the user's exercises, in real time or through scanning audio, video or other recordings in file form. Scoring with artificial intelligence may be based on a set of hundreds of data samples where an expert vocal coach has fed the artificial intelligence system sound or video files and trained the artificial intelligence system with accompanying scores. These scores are sent to vocal data storage unit 110. When system 100 determines that the user's vowel score is high enough, the user would then be prompted through front-end interaction module 114 to complete an activity assembled for the user by vocal development engine 112. The user then begins using these syllables to underlie the user's chosen song. System 100 provides the user feedback as the user sings his song on the syllables to bring his superior vowels into his performance of the song, such that his muscle memory connects the new vowel production to the notes. When he returns to singing the lyrics again, the user suddenly finds his vowel production while singing his songs has become more similar to the vowels he creates while training with his exercises. Thus, the processing and scoring of the data has helped the user achieve a complex coaching issue that in the past could only be achieved primarily via a human expert.

In another embodiment, if an algorithm is unable to use scores from an AI-trained processor to make a proper determination, system 100 sends a notification to an expert human who can score it and further train the AI on scoring correctly.

In another embodiment of system 100, data processing unit 108 processes external data in ways that measure more conventional vocal parameters such as pitch and intensity. This processor scans the data either in real time or as a file, and analyzes it for pitch, using combinations of well-known and conventional algorithms such as zero-crossing, autocorrelation, CEPSTRUM, average magnitude differential function, comb transformation, or FIR filter method of periodic prediction. The intensity of the fundamental pitch is measured using similar methods. In addition, algorithms can be used in cases where the voice is accompanied by musical instruments, to achieve more accurate pitch detection when an accompaniment is present.

As an example of data processing, a user uploads a recording the user made with a voice recorder using front-end interaction module 114, specifying the name and version of the song. The user also indicates, when prompted, if the user is interested in singing the song and wishes to know if it is recommended that the user sings the song at this point in the user's development. The file is then evaluated and scored by data processing unit 108.

Scores are assigned to a menu of values and the information is passed through with attached contextual information to vocal data storage unit 110. Vocal development engine 112 may detect a change to vocal data storage unit 110 and evaluate the changes. It then sends a request to the automatic song selector engine 122, along with instructions for the type of query, the appropriate vocal needed to make the comparison with information about the song, and the most current vocal development level and goals for the user. Automatic song selector engine 122 then generates its advice in the form of a signal (i.e., instructional and informational data) and delivers it to the user in front-end interaction module 114.

As a second example, at the beginning of a lesson with a user, vocal development engine 112 may initiate a check-in query with a user about how the user's life is going and receives data from the user indicating that user has a cold, but is not experiencing pain while singing. This data is sent as a set of inputs that are processed data processing unit 108. The data are processed and scored, resulting in new information stored in the vocal data storage unit 110. The change in vocal data storage unit 110 results in the triggering of the vocal development engine 112, which activates vocal training controller 124 to review the changes. Vocal training controller 124 formulates further questions through sending instructions to the user referencing question content within diagnostic library 126 for further questioning. Once vocal training controller 124 has the vocal health data it needs, determined by its algorithms for these situations processing the new parameters in light of the user's accompanying contextual data, it generates a lesson for the user that includes shorter practices, exercises or drills with smaller than normal ranges so that the user will be challenged less, or may include less singing time overall.

In further cycles of interaction with the user, system 100 checks in with the user throughout the exercise following up with vocal health questions more frequently than usual to make sure the user is not experiencing vocal pain. It may end the session early upon receipt of user-reported data indicating fatigue or detection that the user's voice sounds fatigued.

Vocal data storage unit 110 contains scored data reflecting the user's current status (i.e., vocal assessment) as measured by system 100. For instance, it may contain all the most recent scores for the user, from all data streams and processing units. This data is then pulled by vocal development engine 112 and used to generate and select various content for a user in the form of further exercises and instruction.

The user-reported data reported to vocal data storage unit 110 consists of the non-processed or algorithmic-processed results of the user-reported data, which is self reported by the user. These factors may or may not be updated to change as the user's voice grows and as the user experiences new changes in the user's development.

User-reported data is either archived or generated in real-time. A list of user-reported data may include but is not limited to:

Initial Parameters
Range-Register Data
    For males, this includes lowest possible pitch, lowest comfortable pitch, highest full-voiced pitch, highest possible pitch (falsetto).
    For advanced females, this includes lowest possible pitch, lowest comfortable pitch, highest belted pitch (chest register), lowest head register pitch, highest comfortable note, highest possible note.
    For beginner females, this includes lowest possible pitch, lowest comfortable pitch, shift note (optional), highest comfortable note, highest possible note.
Musical experience level as algorithmically scored using user musical and vocal experiences such as years sang in choir, instruments learned and for how long the user studied, years of vocal study completed, experience singing solos or on stage, music shared on social media, recordings made, advanced music education or years as a professional user.
Age, gender, vocal interests, vocal health issues for issues such as raspiness, vocal pain, tension, or difficult making the voice sound in certain situations including specifics on frequency and severity of problem as well as descriptions of any issues.
Vocal quality including how easy it is to sing in each area of the range, whether the user experiences breathiness, loss of control, weakness, inconsistency, or difficulty in specific regions of the vocal range, as well as goals for vocal quality such as wanting more intensity, clarity, more control, more volume, more resonance, more consistency, for example in the highest, high, medium high, medium low, medium, low or very lowest notes in the range.
Goals for vocal study, including interests such as playing in a coffee shop, karaoke, choir, soloist, auditions, events, professional, front user in a band, cantor, songwriter, studio recording, touring, hobby, novice, and other interests for example.
Ongoing User-Reported Data Collection
Check-in factors may be taken at various points in lessons and practices to gauge user interest, energy, and motivation—energy level, initial stress level, initial frustration level, additional frustration level as well as questions regarding vocal health readings may be taken throughout a practice and user prompted for questions, help, examples, or demos.
Current interest factors may be taken at each interaction, if it is determined to be necessary by the vocal development engine 112 based on the time since last practice, or specific kinds of vocal parameter changes which have occurred. Users are prompted to tell all about things the user is interested in doing or achieving and the user's input becomes part of the user's vocal development goals for training.

The artificial intelligence processed data recorded in vocal data storage unit 110 consists of the scores assigned by a trained artificial intelligence server unit or by an expert human voice teacher, alone or in combination. The resulting parameters are processed in real time or after a recorded event, from a live stream, recordings or other files, and may be stored in vocal data storage unit 110.

The factors may or may not be grouped around different kinds of interactions of the user with system 100, such as when completing a vocal assessment, practicing an exercise or drill, where the notes and durations are known and the technique is set, or while performing songs or activities as applied to songs, where the songs are not known or predetermined by system 100.

Examples of artificial intelligence processed data includes but is not limited to:

Initial and Ongoing Vocal Parameters

Tessitura (area of the voice that is strongest or most comfortable). Tessitura is a major player in understanding vocal type, comfortability with songs, and stage of vocal development.

Vocal type such as soprano, mezzo soprano, alto, contralto, tenor, baritone, bass-baritone, bass, for example, using self-assessed range information in combination with AI for tessitura. This factor might best predict what part a user would feel best singing in a choir, for example.

Vocal quality factors such as level of vocal adduction, tension score, resonance score (oral, nasal, chest), vocal quality profile for scores on qualities like thickness, smoothness, dryness, raspiness, etc. these factors can be used to predict what styles might suit a voice best, to give a user feedback on a performance, or to help a user achieve a better sound during coaching.

Celebrity vocal type: what celebrity voices the user sounds most like, based on scores for gender, style, age, resonance, range, vocal qualities such as: thickness, smoothness, dryness, clarity or breathiness of the sound, whether females are belting much or transitioning away from the belt, and whether males are using falsetto much in the songs. This set of factors may be helpful for users looking for songs to work on, for example. Often when one song by an artist fits a voice, other songs by the same artist may also fit the voice or style of the user.

Vocal health: In addition to the self-assessed factors collected by system 100, certain factors such as raspiness, incomplete adduction, and specific types of under-adduction may signal an underlying health condition. System 100 may notify the user if a problem is detected.

Coaching Exercises and Drills

Posture: scores user during breathing exercises—detects and scores tension in the singing posture at the hips, shoulders, arms, hands, neck, jaw, or throat.

Breathing: scores breathing during exercises—inhaled breath size in each of 3 diaphragmatic directions, as measured during breathing exercises based on length of exercise and capacity of user. Exhaled breath, time able to hold a note or create a hiss sound on one breath.

Tongue: scores for tongue exercises including rate of exercise, duration of exercise, jaw tension during tongue exercise, extension score Humming: scores for voice during humming exercises—includes scores for humming resonance, glissando, sound intensity, and pitch.

Syllables: scores for clarity of vowel production during Syllable exercises—includes individual scores for individual vowels measured, such as "o" in "obey".

Speaky voice: scores for vocal adduction during "speaky voice" exercises, in conjunction with separate scores for vowels, resonance and pitch. "Speaky voice" is the sound of the user's normal voice without nasal resonance and sounds similar to singing or speaking while pinching the nose closed. Vocalizing in this way with less nasal resonance makes it much easier to produce clear and healthy sound at the vocal cords, as back pressure onto the vocal cords from regurgitated air descending from the nasal passageways is greatly reduced.

Expressivity: scores for dynamic range of quiet to loud, applied on specific notes, phrases or sections of an exercise, score for connectedness of adjacent notes (i.e. lyricism or glissando).

Coaching/Choosing/Advising Songs and Activities

Posture scores at time points during the performance of a song, as scored via video or visual medium for tension in spine, hips, shoulders, arms, hands, and neck, for example. Problems with posture may also be detected through scoring the sound of tension in the voice, especially caused by jaw tension, tongue tension or neck/shoulder tension.

Breathing scores during the performance of a song, scoring frequency and timing of breaths to maximize breathing without making entrances late, for example. Breathing parameters may also include length of successfully sung phrases and supported sound as measured by level of pitch sagging, for example.

Level of vocal adduction (overall and register-specific) during the performance of songs and how these scores correlate with other parameters. How breathy or intense the core signal of the voice sounds, whether it is register specific, vowel specific, or style specific.

Resonance scores during the performance of a song, including vowel-related scores and scores for nasal, oral, and chest resonance throughout the song.

Vowel scores during the performance of songs, including scores for each vowel and how these scores correlate with other parameters. Parameters describe how well-formed, distinctive, and clear the vowels sound for each vowel being used, for example, including dipthong and tripthong vowels and other vowel hybrids.

Diction score for consonants during the performance of songs. Scores for various individual consonants in addition to overall clarity and appropriateness for style being sung may be measured. Additionally, the system can analyze audio diction (i.e., vowels and consonants) to detect speaking issues such as lisp, foreign, or regional accent. Depending on what the speaker would like to achieve, the system can generate specific lessons and exercises to help the user modify these areas of speaking. For example, a user may reduce her Singaporean accent or fix a leaky "s" sound across her speaking pattern. Another speaker may learn to roll his Italian r's for example. The diction score is applicable to speaking or singing in any language, to modify an accent in any language. For example, any user could use this invention to make the user's accent sound native for any language.

Vocal strength (overall and register-specific) during the performance of a song. Since volume is a factor controlled by breathing and level of adduction (intensity), scores differentiate between breathing strength and adduction strength.

Vocal expressivity during the performance of a song, including factors such as dynamic range on individual notes, phrases, or larger sections of the song, including mezza di voce score (another type of dynamic vocal technique), leaning on pitch in some styles, score for vocal connection of pitches together (legato), sliding the pitch (glissando), carrying the pitch (portamento).

Performance technique during the performance of a song may be visual as for blocking, hand motions, postural looseness, or tension scores during motion, for example, or may be auditory such as scored for shaky or trembling voice, difficulty breathing, or other signs of nervousness in the user.

Vibrato score—the wobbling of pitch or intensity based on natural vibration of the larynx with relaxed, intense singing (healthy) or from pushing air in an unnatural way (unhealthy), for example.

The mechanically assessed data section of Vocal data storage unit 110 consists of mechanical scoring of any or all data streams available to system 100. These resulting factors may become variables in the algorithms that define the generation of content in the vocal development engine 112. Examples of mechanically assessed data includes but is not limited to:

Pitch of expected sung note

Pitch differential between expected and sung note

Cleanness score for transitions between pitches

Vocal expressivity during the performance of a song, including factors such as dynamic range on individual notes, phrases, or larger sections of the song, including mezza di voce score (another type of dynamic vocal technique), leaning on pitch in some styles, score for vocal connection of pitches together (legato), sliding the pitch (glissando), carrying the pitch (portamento), for example.

Vibrato score, depth of changes in pitch or changes in intensity of a held pitch Vowel scores from spectral analysis for each individual vowel Pitch variation and patterns in speech Vocal development engine 112 is the core logic center of system 100. Together with all its components, vocal training controller 124 is responsible for using vocal parameters and the vocal training history to define levels of vocal development for the user. Then, tracking the user's development level and goals, it chooses, orders and generates materials to offer the user that fit the user's voice to facilitate the achievement of the user's vocal goals and develop the user's voice.

Training changes dynamically with user input, such as emerging interests (for example, new songs, new styles, or questions the student has about singing that signal increased interest in a topic), vocal training goals reached, new goals identified, changes in vocal health, or changes in vocal skill level, for example, to offer the user appropriately-generated questionnaires, reports, quizzes, exercises, drills, song offerings and advice, lessons and activities assembled to comprise the user's vocal training course of study. Because these materials are generated based on dynamic and personalized vocal training goals, system 100 may address much deeper levels of vocal training with users than previously possible.

Vocal development engine 112 contains vocal training controller 124, which oversees and directs all the other items in vocal development engine 112. Vocal development engine 112 also connects to vocal training database 128, which stores and logs identifying and contextual information around the collection or production of a vocal parameter, including when system 100 was last logged into, user activity on the platform, when and in what context a vocal parameter was produced, for example. under the authority of vocal training controller 124, vocal development engine 112 also contains vocal profile report generator 130, automatic exercise & drill generator 132 for dynamic exercise generation, the automatic song selector 122, and lessons & activity library 134, which hosts static fragments of multi-versioned materials which may be mixed and matched together to create personalized or nuanced lessons for different situations with users.

A user's vocal development level is calculated with algorithms using all described data streams. The expert human or ai-scored factors which figure into determinations of vocal development level are all parameters listed above, over time. Because a user improves gradually, the user's voice may be compared with previous historical data such that the user's trajectory may be plotted. Scored data is compared with previous readings for that same factor, in conjunction with history stored in vocal training database 128. Thus, all of the factors listed above over time give snapshots that allow system 100 to plot overall progress as well as the progress on individual items.

As long as a user continues to use system 100, system 100 will still produce exercises and help the user choose and develop new skills to a high level of preparation. Any time an area is scored as deficient, system 100 will remind the user of previous training and help the user use it to apply to new songs and situations.

Advanced vocal techniques are a juggling act of all the basic vocal techniques. There are limited rules for good singing or speaking, but the trick of getting to a professional level is being able to do all the techniques at once. System's 100 feedback and vocal development score which "learns" the user and compares the user's performance in each factor score to its predecessor may be compared against a set of rules for "perfect" singing and trajectory measured in getting to that point for that specific user.

When the user has reached a plateau for all areas of growth, the goal at that point becomes reminding the user of all the techniques the user knows, and prompting the user in real time, or just after the user finishes a song, which techniques to focus on at that specific time. Algorithmic rules may exist which govern this overall coaching process, ordering and prioritizing vocal development goals for each level of development.

Vocal training controller 124 is the central organizer, chooser, and controller of vocal development engine 112. Vocal training controller 124 contains all the algorithms (mechanical or AI-based) needed to make decisions as to the timing, selection, ordering, and generation of materials to present to the user through front-end interaction module.

The functions of vocal training controller 124 include but are not limited to: constantly reading vocal data storage unit 110 for new parameters while system 100 is in use; controlling vocal training database 128; calculating the user's vocal development level and goals parameters using the most recent vocal parameters list as well as historical vocal parameters, including associate context information for those parameters listed in vocal training database 128; based on its algorithms, determining what to offer the user next; and based on what will be offered to the user next, sending instructions (in some cases with appropriate variables) to generate or select materials from these five entities: vocal profile generator 130, automatic exercise & drill generator 132, automatic song selector 122, lessons & activity library 134, and diagnostic library 126.

For multi-versioned static materials such as housed in lessons & activity library 134, or questions in diagnostic library 126, vocal training controller 124 will choose and organized appropriate versions of these materials and send these choices with ordered instructions to front-end interaction module 114 for presentation to the user.

As data is collected by front-end interaction module 114 during interaction with the user, vocal data storage unit 110 will change. Thus, the decisions about what to offer the user next may change based on the most recent data processed and vocal parameters recorded, including for example, parameters describing the user's health, energy level, or interests, deficiencies detected in the user's performances, deficiencies detected in the student's knowledge of a subject, changes in the vocal profile, mastery of a new skill, or any other factor that may create changes in a user's vocal development level or vocal development goals.

In another embodiment of system 100, the training strategy is generated in real time, or vocal training controller 124 creates and stores an ongoing strategy for its decisions, containing a number of steps which may be modified in real time as the parameters change.

Vocal training database 128 holds all recorded vocal parameters from the opening of the user's account with system 100 through the present moment. Vocal training database 128 also holds historical contextual information regarding user's logins to system 100, training performed (such as checking in, diagnostics, reports, practices, exercises, lessons, songs, activities, and viewing feedback), and cataloguing information related to the collection or production of a vocal parameter, including when and in what context a vocal parameter was added to vocal data storage unit 110.

Vocal training database 128 is operated by vocal training controller 124 and stores all the historical data described above, which it also sends out upon request to vocal training controller 124 to be used in calculating vocal development level and goals, informing decisions about training strategy, and sends instructions to other vocal development engine 112 components.

Using factors from all areas of vocal data storage unit 110, vocal profile report generator 130 may create diagnostics, quizzes, questionnaires, reports, presentations, and assessments communications regarding the user's current vocal state of development.

Figure 3:
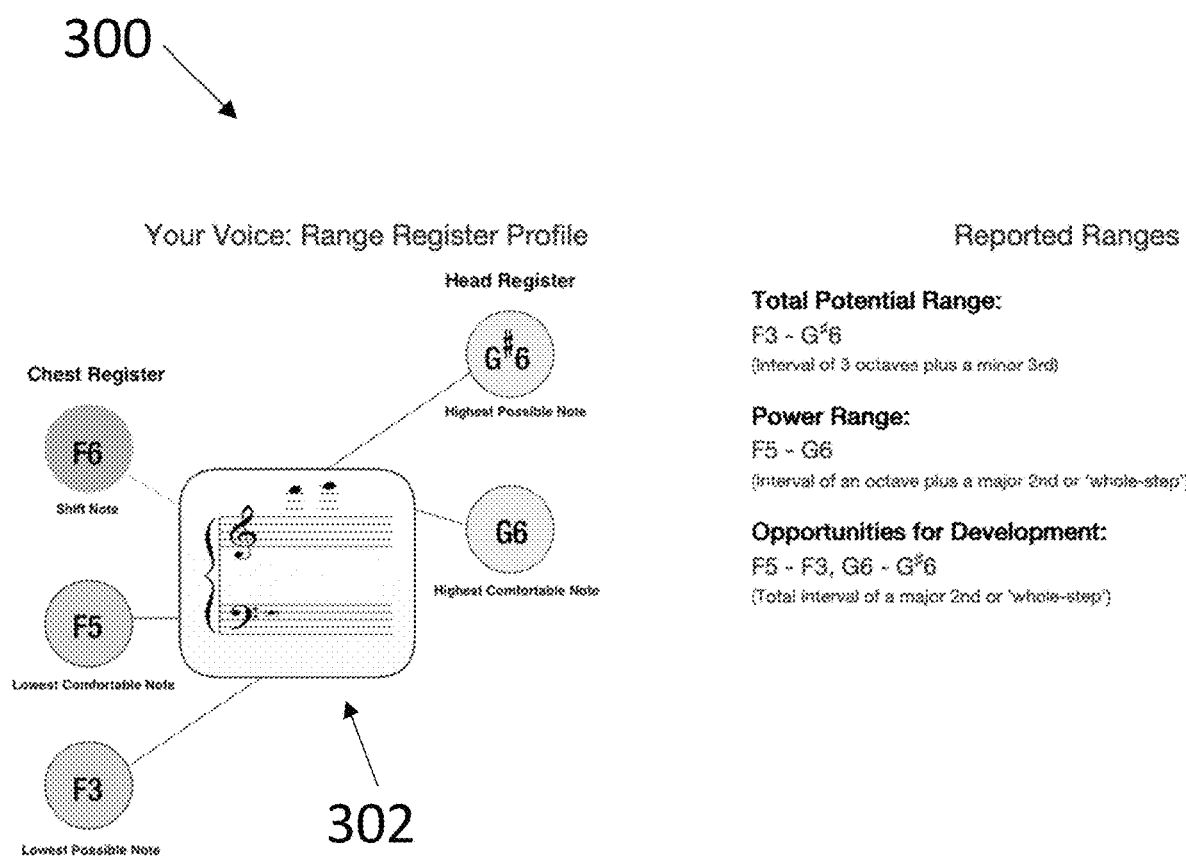
FIG. 3 depicts an embodiment of a portion of a user interface displaying a user's vocal profile report.
Figure 4:
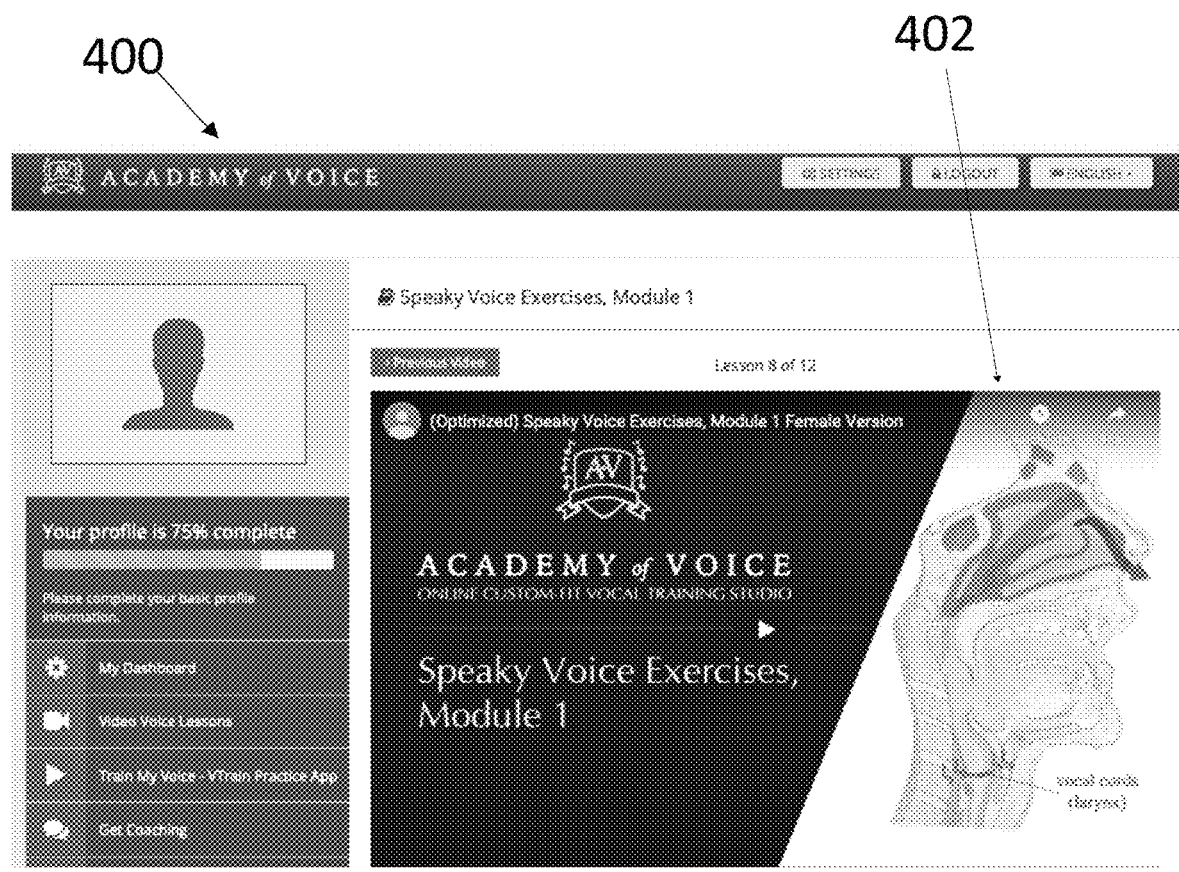
FIG. 4 depicts an embodiment of a user interface for delivering a vocal exercise to a user.

A vocal profile report presented to the user includes but is not limited to range-register vocal profile information (such as data on usable range, absolute (potential) range, transitions between registers, etc.) presented on a musical staff with description of limits, areas of potential growth, and instructions for choosing songs based on this information, vocal or musical experience level, vocal age, vocal type (such as soprano, alto, tenor, bass), vocal quality and stability as experienced by the user, pitch accuracy, tone quality, level of adduction at the vocal cords, user interests, celebrity users with voices matching the user's in range, style or intensity, suggested developmental goals, styles, or types of training needed, or other information related to the user's vocal development, interests, or associated topics. An example of a section of a vocal profile report 300, is shown in FIG. 3. As displayed in this figure, this section 300 contains a detailed analysis of the user's vocal range as shown in diagram 302.

A vocal profile report can be in written form or presentation form, and may contain or be comprised of other media, such as video, audio, VT, conversational format with a human or AI vocal expert. Other presentations may be generated at any time in the process of training, and assessments may occur during lessons, as part of reading or course materials, as part of video voice lessons, quizzes, vocal training-related activities, or vocal coaching with a human or AI expert.

Returning to FIG. 1, automatic exercise & drill generator 132 generates dynamic vocal training exercises or drills in audio, video, VR or other format with sound that may be customized to fit the usable and absolute range, experience level, or vocal interests and the user's goals utilizing factors from all areas of vocal data storage unit 110, especially the vocal profile.

Based on the most recent vocal profile data collected, automatic exercise & drill generator 132 creates vocal exercises that may start in the user's comfort zone and then continue into areas of the vocal range that are less developed. As the exercise sets continue, the user may "warm" up the voice, gradually challenging the voice to higher and lower than the comfortable range allows or becoming more complex in nature, using faster speed, or employing more ornamentation to create a challenge for the user. The aim of these exercises is to further vocal development and growth in the form of expanded usable range, smoother transitions between vocal registers (like gears shifting in a car), improved vowel quality and distinguishing ability, improved vocal tone, more efficient adduction in the core vocal sound (improving clarity and vocal health), or challenging the user to move more smoothly, more quickly, and more accurately from note to note.

In order to produce custom-fit exercises that achieve these goals for each individual user, automatic exercise & drill generator 132 uses any and all factors from vocal data storage unit 110, with emphasis on user-reported data, in combination with other data, to determine that exercises are all started in the user's reported comfort zone, that the voice is challenged in range, speed, and complexity, and that exercises leave the voice feeling challenged but not over-tired or strained in any way.

The system 100 may also use artificial intelligence, in conjunction with user-reported data or without receiving any user-reported data, to analyze the user's audio and/or visual data, while the user performs a song or some type of speech/speaking exercise. Based on the artificial analysis of the user's voice and video data, system 100 detects the user's highest-comfortable range and the user's lowest-comfortable range while the user performs the song or public speech. In this example, the user's highest-comfortable range represents a highest-vocal boundary of the user, in which the user can comfortably sing or speak. Conversely, a lowest-comfortable range represents the lowest-vocal boundary of the user, in which the user can comfortably sing or speak. Typically, the user's highest-comfortable range is a vocal range, which falls below the user's highest-achievable-vocal range. And typically, the user's lowest-comfortable range is a vocal range, which is above the user's lowest-achievable-vocal range.

Specific areas of the user's vocal range are targeted for improvement. For example, exercises may start in the middle of a female's comfortable chest register and continue upward through the transition into the head register until it reaches the appropriate level of challenge to her high register. Likewise coming down, the exercise may begin in the center of her comfortable head register and continue downward through her transition into chest register, and then extend down into the chest register to challenge her lower range. In contrast, a similar sequence of exercises for a male might challenge different areas of their range or registers.

The starting and ending pitches, once determined by the algorithm, define the beginning key the exercise will start in and the key that it will end in. Audio, video, VR or other files of the exercises, which may be stored in a library of all possible repetitions in various keys, are then selected from the library, sequenced, and concatenated into tracks with a distinct beginning, middle and ending such that the exercises move up or down gradually, key by key in half-step intervals, in some cases between the beginning and ending keys.

Some exercises will not shift through all available keys, but will change at other more distant intervals, such that exercises in a few representative keys may fall within the comfort zone and then challenge the voice. Some exercises may not be sung, such as posture, breathing, or tongue exercises, but the user is still given exercises based on stage of vocal development, experience level, vocal health factors, interests, or determined needs. Vocalization on exercises may include sounds other than singing. The exercises may require the user to use humming, trilling, hissing, sighing, or other vocalizations, or the exercises may require that the user stretch or perform body motions, or even motionless exercises for the mind, such as visualizations, grounding techniques, or mindfulness techniques adapted for users.

One other capability of automatic exercise & drill generator 132 is to produce drills, or short patterns of notes identified during coaching as problematic by system 100. As a user performs exercises, there may be "trouble spots" identified. The notes of a short region of a melody which are consistently problematic for pitch, for example, may be analyzed via vocal training controller 124 and specifications including pitches and duration with slowed down tempo sent to automatic exercise & drill generator 132 to be generated for the user. The exercise may then be presented to the user with instructions in front-end interaction module 114.

Songs are very important in the vocal training process as motivators, even for users who have speaking improvement goals. When users begin learning exercises, there is resistance to practicing because the material feels 'foreign' to the user, whose identity is very strongly connected to her voice. One technique a voice teacher may use to motivate her student to practice, in this early stage, is to have her student work on songs that the student enjoys and corresponds to student's voice usable range, difficulty level, and style, amongst other factors.

Automatic song selector 122 is a program which uses commands and instructions, and appropriate vocal parameters from vocal training controller 124 inside the Vocal development engine 112, which it cross-references with parameters in training materials database 136 to help users find and select songs or other training materials that fits the user's vocal profile, stylistic interests, vocal goals as self-reported and AI- or human expert-determined, and vocal development level and goals as determined by the vocal development engine 112.

Automatic song selector 122 also has an advisory function that, based on the input of a user attempting to sing a song, makes recommendations to the user regarding whether a song should or should not be attempted, and which conditions should be met in order for the user to sing the song, as determined by expert human or AI scoring of several factors described below and subsequent algorithmic determinations based on those scores.

Both of these functions are bolstered by cross-referencing user capabilities, preferences, and the trajectory of the user's vocal development with information in training materials database 136, a database of training material such as songs from a variety of genres, labeled with highest and lowest notes needed to sing the vocal part (range), the notes the user spends the most time singing (tessitura), the styles or genres the song has been performed in, artists who have performed the song, and whether the song has a gender assigned to it.

In one embodiment of system 100, automatic song selector 122 breaks down the process of learning songs into parts as songs get harder. For example, first asking the user to hum the tune, then singing the song all on "loo" with no words, then speaking or intoning the words in rhythm at various speeds, then starting slowly and speeding up to desired tempo, and finally combining the tune with the words as the user sings the song.

Breaking down the learning process for songs is important because if a song is not properly learned from the beginning, many mistakes can be made and will continue to happen when the user is exposed to anxiety-producing situations, such as performances. In order to keep bad habits or mistakes from happening or recurring, it's best to build the song from the ground up, making as few mistakes as possible. The user should learn to go through these gradual steps as he learns his songs or speeches, and the job of the advisor is to navigate determination of the steps, the details of the user's timeline, and the assessment of the user's readiness to go to the next step in the development process.

Songs may also be labeled with difficulty parameters including: overall difficulty level, agility score (rate of vocal notes and interval content such that songs with larger leaps and faster notes are rated higher), breathing skill score (songs with more time between breathing spots, or with long phrases receive higher breathing skill score), range of song (wider intervals from highest to lowest note sung receive higher scores), and stylistic skills score (identification and scoring of skills such as scatting and growl in jazz, long rolled r's in Latin music, or yodeling in traditional European music). Training materials database 136 may be cross-referenced against the most recent data stored in vocal data storage unit 110, including vocal development scores and goals. Using conventional or AI algorithms, system 100 offers appropriate song options or determines whether songs a user is interested in singing is appropriate, and if not, when and how these songs might become singable.

Another use that voice teachers have for songs beyond the early need for motivation in getting the user started training is continued development of the voice, and continued motivation to train upon experiencing vocal transformation. As a user's voice develops, the user's performances of the same songs become easier and the fruits of her efforts become apparent in her performances of said songs. Advanced vocal tools learned in exercises may be brought to bear directly on song performances, such as breathing techniques, posture, resonance or vowel work. Songs may also be interpreted and analyzed in an effort to bring more emotion and connection with the audience in a user's performance of said song. Song development is a major pillar of advanced vocal technique.

Automatic song selector 122 thus functions also to continue offering appropriate songs taking these needs into account. Songs fitting the user's vocal abilities as the user changes and grows may be offered to the user that creates challenges without being too difficult or discouraging. Song options offered continue to conform to user's stylistic interests, which often change as the user is exposed to more vocal training. Eventually songs are chosen for the user by system 100 in addition to user-chosen songs when it is clear that specific songs are helpful for learning specific techniques, skills, or how to overcome specific obstacles with respect to the user's vocal developmental needs. One type of song offered may be the etude (or short teaching song) from various classical genres which may extend the purposes of vocal exercises into a more advanced form, and provides an experience in which users may learn to juggle multiple learned vocal techniques concurrently without pressure from modern day stylistic considerations or identifying with the old way of singing. Automatic song selector 122 may present to the user complete songs, parts of songs, lists of songs, song recordings with users, song recordings with accompaniment only, videos of songs, songs in VR format, song lyrics, song chords or tabs, song sheet music, or other song media.

In another embodiment of system 100, automatic song selector 122 also includes an area for the user to store the user's own song files, including but not limited to: karaoke tracks, accompaniment files, recordings of the user playing an instrument, sheet music in any form, lyrics, song sheets, lead sheets, audio recordings of songs, video recordings of songs, VR presentations of songs, links to songs on the internet, or any other files related to songs.

Using expert human or AI capabilities along with conventional or AI algorithms, the advisory program of automatic song selector 122 may be used to advise a user whether a song of her choosing would be a next appropriate step to pursue for her own vocal training, as measured by factors such as her vocal profile, current usable range, experience level, and vocal development level.

In one embodiment of system 100, for example, the AI scores a recording of a user attempting to sing the song along with the original artist and, based on scores for pitch, accuracy, difficulty level, and vocal comfortability, employs an algorithm to make such exemplary recommendations as: skip the song for now or change it to another key (key or key relationship offered) so as not to discourage user or harm the voice, keep the song in a current key, but use it as a "reach" piece for vocal development at a future time (time determined by AI vocal developmental tracking), or begin working on the song as is right now.

Every user comes to training with different levels of training, and at different levels of vocal development. Males and females will discuss different aspects of range and register, for example, while experienced females may work on "belting," while less experienced females might need to learn more about their transition before attempting these activities. Lessons and activities for different users will thus have different versions and be taught at different times, depending on the user's vocal profile, vocal development level and vocal development goals, as determined by vocal training controller 124.

Vocal training controller 124 makes a determination that a student is ready for a specific lesson or activity, and send instructions for the creation of that lesson or that activity, including ordered commands and references to selected files in lessons & activity library 134 for the user's compilation by front-end interaction module 114 to be presented to the user.

While lessons are more lecturing in nature, and may teach anything regarding singing or speaking, from vocal theory or anatomy to skill development such as how to do exercises, for example, activities are shorter in duration and in some cases may be applied to a song of the user's choosing. Although the content is static, there are multiple versions of the content available to use in different situations with different types of users for different purposes. The content is referenced by the instructions so it can be assembled to order by front-end interaction module 114 for each situation and user, in tandem with other materials being generated by vocal profile report generator 130, automatic exercise & drill generator 132, automatic song selector 122, and diagnostic programs created by vocal development engine 112 with materials from diagnostic library 126.

A core function of system 100 is the collection of data from the user not only at the initiation of working with system 100, but also throughout the process of vocal development. While vocal training controller 124 decides what questions are asked at what time and in what format, all questions for all query-based actions in system 100, such as quizzes, questionnaires, assessments, diagnostics, singalongs, user-reported questions, or conversations with system 100 (or AI "coach," if applicable), are stored in diagnostic library 126, controlled by vocal training controller 124 inside vocal development engine 112.

When vocal training controller 124 makes a determination that more user-reported parameters are needed from the user, vocal training controller 124 sends instructions for the creation of one of the above-listed question formats with selected questions referenced from diagnostic library 126.

Front-end interaction module 114 is how the user may works with system 100, performing various interactions, including but not limited to: receiving training, using vocal training tools or exercises, watching lessons, practicing exercises, singing songs, completing activities, taking quizzes, answering questionnaires, having conversations with a human expert (or an AI "coach") or receiving feedback on the user's performance of any of these interactions.

Some examples of generated vocal training as presented to the user by front-end interaction module 114 include but are not limited to:

Diagnostic

Filling out a questionnaire, answering questions about the user's previous vocal experiences, which may or may not assess: what age she started singing, what kinds of exposure she had to musical education, how many years she sang in a choir, what instruments she played and for how long, qualification of prior experience with solo singing or performances, descriptions of any advanced musical education, vocal study, or experience as a professional vocalist, among other factors, for example. Although this activity is for the collection of user-reported data, the interaction for this activity happens within front-end interaction module 114 as just one activity amongst the others. The process of data collection is not separated from content presentation in the user's experience interacting with system 100.

Viewing a recent vocal profile report (generated by vocal profile report generator 130) describing user's vocal profile, including usable and absolute range along with self-reported pitch data describing the user's transitions among gender- and experience-specific registers, a description of advice about how to choose songs based on the user's current vocal profile data, list of similar celebrity artist voices, vocal experience level, vocal age factors the user may be facing, vocal quality as reported by the user about the user's singing experiences, or goals for vocal development as reported by the user about various areas of the user's vocal range, for example.

Watching a personalized progress report presentation in the dashboard of the user, presenting the user's vocal development as defined by changes in the user's vocal profile (usable, absolute ranges and gender- and experience-specific transition points), singing posture, breathing capability, the user's accuracy (as measured and analyzed mechanically or by expert human or AI) with various vocal training exercises in terms of pitch, rhythm, intensity, flexibility, fluidity, tension levels, achievement of proper vocal adduction, resonance, expressivity, vowel formation, use of resonance and appropriate breathing patterns for the user's songs, for example.

Viewing updated vocal training goals, including priority levels for each, in the user's dashboard, assembled from the current based on input from the user and determination of system 100 based on data collected similar to the above examples.

Any of these examples might also be presented in whole or in part, in another format, as in a report, a list, a multimedia presentation, an audio, video, or VR recording, email, webpage, conversation with live or AI coach, or other format.

Training

Training the voice by performing non-vocalized exercises, such as achieving a healthy singing posture, working on breathing exercises, or tongue exercises, to warm up, loosen, and strengthen various parts of the body associated with singing including the diaphragm, larynx, and vocal cords, but without creating phonation, or adducting the voice to create sound. The user performs the exercises in tandem with slides containing images, videos and text describing the exercises step by step. Although the exercises are not customized based on vocal profile information since the user is not pitched, the exercise is still customized for skill level, and stage of vocal development. Priority of vocal development goals is also a factor in what exact practice specifications a user is given at any one time, based on recent practices (or lack thereof.)

If running low on time, the user may modify the workout to a shorter length and each exercise will be shortened accordingly based on total time available, taking into account the vocal development level and the priority of vocal development goals for this user.

Training the voice by singing along with customized vocal exercises played on a webpage with multimedia slides containing notes and images to remind the user how to perform the exercises as she learned to them in a previous video voice lesson. Customized vocalized exercises may consist of vocalizations such as humming, speaky voice (singing with little to no nasal resonance in order to help learn to adduct the voice), or be sung on specific syllables for example. These training exercises, unlike any available from other systems, are based on user-reported data indicating which areas of the voice are comfortable (usable range) and where gender- and experience-specific registral shifts occur in the user's own voice, in tandem with other data sources such as mechanical pitch analyzers.

User's exercises may be played faster, challenge the extreme ends of the vocal profile further, or challenge the user with more ornamentation, extending more challenging leaps with larger intervals. The exercises may also gain levels of difficulty as the user's vocal development takes her skills to the next level. New or more advanced exercises, or a modification of an older exercise, may be offered by system 100 for the user as he completes a necessary skill set, is shown to have mastered an older exercise, or when he has indicated to system 100 that he is bored of an old exercise or it is determined by the system that the user has stopped benefiting from doing the old exercise. Likewise, if a user is not getting certain aspects of an exercise correct, she may be given more extensive lessons, materials, drills specific to building the skills necessary to perform the exercise, or other rudimentary materials to help the user achieve the exercise properly. In one scenario, system 100 alerts an expert human vocal coach that the user requires further work on the specific exercise, with all the associated information included.

Singing

Names of songs, song sources, materials, or songs themselves, either with a user or with an accompaniment background in any format (audio, video, VR, etc) may be offered by system 100 as a possible assignment, based on the user's stylistic interests, similar voice type to a celebrity artist, vocal profile, especially usable range, experience level, and stage of vocal developed as measured by system 100.

A user may have a song in mind and be looking for advice as to whether she should sing the song in the original key, try a better key for her range, or shelf the song for now if it is too difficult at her current level of vocal development. In one embodiment of system 100, a user may send a file containing a recording of the user's attempt to sing the song. System 100 analyzes this data, either with help scoring it by an expert human or trained AI processor. After being given her scores for pitch, accuracy, difficulty level, and vocal comfortability, the user is advised to sing the song but perform it in a key three half steps higher than the key of the songs that was sent through system 100.

A user loads the user's sheet music, accompaniment tracks or lyrics into the practice area of system 100 and then practices the song. The user makes a recording for submission to system 100 via a "record" button on the player.

Coaching

As an example regarding a user performing an activity generated by lessons & activity library 134 with a song of her choosing: the user may first watch some instructions on her VR headset, then, as directed, may attempt to sing her song using a pencil between her teeth (to keep her jaw from moving and changing the pressure on the vocal cords). She focuses her attention on maintaining the same position of the jaw even when she takes the pencil out of her mouth. She experiments, and her efforts may be analyzed by the vocal feedback generator in real time or may be recorded, analyzed, and the results sent to her later separately or as part of the next lesson. The next lesson may either pick up with more of this work, perhaps with modifications made to take her prior efforts into account or move on to other areas as the user achieves a consistent resonance level and consistently sings without tension in the jaw, for example.

A user loads a recording into system 100 that was made with his cell phone of himself singing one of his songs. System 100 scans the file and determines, as part of an entire diagnostic with many mechanical and or AI-based scores and observations, and using conventional or AI algorithms, that there is a region of the song that the user is consistently singing off-pitch. Vocal training controller 124 sends instructions, including pitch and duration information, to automatic exercises & drill generator 132, commanding it to create a short exercise for the user consisting of a short series of notes repeated at a much slower tempo. The user, with instructions to focus on matching pitch, can practice this pattern in isolation until it is mastered and the user can sing it on pitch. Once that is achieved, the user's tuning of that problematic spot in the song will improve. Any exercises of this nature may be generated for pitch- or tuning-related issues. Any exercises of this nature may be generated for pitch- or tuning-related issues.

A user performs a song and system 100 scans it in real time and determines, as part of an entire diagnostic, such as listed above, that there is a region of the song, that she is consistently performing with an incorrect rhythm. Vocal training controller 124 sends instructions including duration (or pitch) information to automatic exercise & drill generator 132 with instructions for the creation of a rhythmic drill for clapping or speaking, or singing on the appropriate rhythm with or without pitch information, such that the user may practice the rhythm and text underlay of that one region she is struggling with.

A user is singing his song and system 100 detects in real-time that the user is not taking large enough breaths as part of the user performance. Vocal development engine chooses an activity lesson for the user on larger breaths. The user is prompted to watch the lesson and then perform the user's song doing the activity. The user's performance is either streamed and processed in real time or recorded and analyzed just after the user finishes. Front-end interaction module 114 then uses the vocal feedback generator in conjunction with the rest of system 100 to offer the user feedback regarding the user's performance, including short snippets of the recording (audio, video, VR, etc.) which illustrate the feedback. Thus, the user can see exactly where the user had the problem and knows what to do in order to correct it.

If a user is consistently scoring low for vocal adduction, her voice may sound breathy and quiet, her notes may be going flat, and she may be rapidly losing her air. She also may be experiencing hoarseness and difficulty getting to the ends of her phrases. Up until now, she may not have had enough background to approach this issue in vocal training.

If system 100 detects that a user's vocal development is at the desired level, the user may be given a lesson by vocal development engine 112 on humming exercises, which may help them to strengthen the adductor muscles in the larynx. After watching the lesson, the user may complete a quiz. When it is determined by system 100 that the user has adequately learned the material, the user is presented with a customized video exercise to practice with. It starts where the user's voice is comfortable and gradually challenges the user's voice. The user then practices the exercises within front-end interaction module 114.

The coaching function may detect in real time that the user is making consistent mistakes in humming the notes in a rigid way, which may create vocal tension for her and make her voice tired quickly. She is then given instructions to hum the exercise in a more connected way (glissando) to help her voice relax.

She lets system 100 know with a voice command that she doesn't understand the directions. At that point she is played a demo of a female with a similar voice demonstrating the glissando, and she is prompted to practice along with the demo until it is determined by system 100 that she is using proper technique. If this situation is not resolved with the use of system 100, an expert human vocal coach is alerted to give the user a call or address the issue at the next lesson.

Through its connection with the rest of system 100, including data collection unit 106, a data processing unit 108, vocal data storage unit 110, and vocal development engine 112, front-end interaction module 114 gives the user real-time or post exercise feedback for any interaction with the user.

In one embodiment of system 100, feedback is produced and communicated to the user in real time programmatically, or sent out in another format through another communication form, such as email, text or call during practice sessions, practices with exercises, during vocal activities or coaching sessions, or when the user is not singing with system 100. Feedback also includes observations by an expert human or AI regarding vocal techniques the user is or is not using properly in the user's exercises, for example: issues with tension, posture, adduction, pitch, vocal quality, vowel production, resonance, expressiveness, song interpretation, or performance technique.

In one embodiment of system 100, feedback occurs during lessons, as part of reading or course materials, as part of video voice lessons, quizzes, vocal training-related activities, or vocal coaching with a human or AI expert.

The following are examples of how a user can front-end interaction module 114 in one embodiment of system 100:

Receiving feedback as a video sent through email on a recent recording of a song performance the user had uploaded to system 100 through the upload portal in front-end interaction module 114. Feedback might consist of advice for future training created by an expert vocal coach or based on algorithms enacted on mechanically-scored factors (such as pitch and rhythmic accuracy, or vocal intensity, for example), or on expert human- or AI-assessed factors (such as level of vocal adduction, tone quality, resonance, vowel clarity, tension level, posture, level of expressivity, or dynamic expression, for example).

Receiving real-time feedback as the user performs her song. She may hear through a speaker or see as words on the screen, or see an AI coach in VR, for example making corrective statements about her posture, vowels, breathing, phrasing, adduction, or diction, for example, as she sings.

As the user adjusts her vocal production in line with the feedback she receives, system 100 continues to produce feedback to let the user know if her correction is working or if it is still off, and how the issue should be addressed, for example.

A user might stop the singing to watch a recording of her singing along with annotated feedback on the clip with scores in a visual feedback format for example, or she may be presented with diagnostic information in a variety of other ways, depending on the student's preferred learning style, vocal development level, or type of skill being discussed.

Training materials database 136 is a dedicated storage area for any generated or uploaded materials for the user's vocal training, as created by vocal development engine 112, or uploaded by the user.

For example, if vocal development engine 112 generates an exercise for the user, the exercise may remain in the database for use in the future until vocal development engine 112 determines it or a similar version of the exercise should be generated again with new specifications. If a user uploads a song the user desires to practice along with, engine 112 will present the exercise and song through front-end interaction module 114.

Role of Expert Human Vocal Coach

In another embodiment, system 100 incorporates an expert human vocal coach to provide support in processing data inputs (scoring or evaluation), providing checks on system decisions regarding any aspect of system 100, correcting errors or aiding the AI in making decisions when data is inconclusive. System 100 sends out requests to an expert human in cases where it needs more direction, the user has exhausted all of its efforts to create progress, or there is an impasse of some kind for system 100. An expert human vocal coach can then access system 100 to intervene at any point in any of the functions or programs included.

Social Functionality

Community performance opportunities can motivate singers and speakers to train more, enhance performance skills and help them overcome stage fright. In a similar manner to a human voice teacher, in one embodiment, system 100 leverages community and performance opportunity to accomplish these same goals. System 100 prepares a user to perform for an audience, assess the user's work, and determine at what point the user is ready to meet specific goals such as: record him or herself, receive feedback on performances, strategize about how to improve performances, or to show before and after videos of performances to increase singer motivation. At some point, the user may share recordings or live performances. This can help a singer learn more about how to assess vocal technique of other singers or speakers to further aid in training.

In another embodiment of system 100, front-end interaction module 114 includes a leaderboard and social media engagement or internal community features to increase training motivation and support.

Real Life Performance Guidance by an AI or Expert Human

In another embodiment, system 100 provides the user with guidance from an AI voice teacher regarding mini goals for performance opportunity seeking such as: auditioning for community theater, putting together a band, playing out at an open mic or singing with a choir. System 100 provides the user with lessons and advice related to pursuing real-life performance goals, similar to how a vocal coach would make referrals, help the singer break up the big goals into smaller goals, and recommend various audition songs, techniques, and advice around doing auditions, choosing songs, preparing songs. System 100 also aids the user in the process of making real life preparations, using feedback based on the results reported back by the user in combination with external feedback to create tailored lessons that will get the user to the user's performance goals.

Methods of Operation

Methods for vocal singing and spoken vocal training using system 100 may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 5:
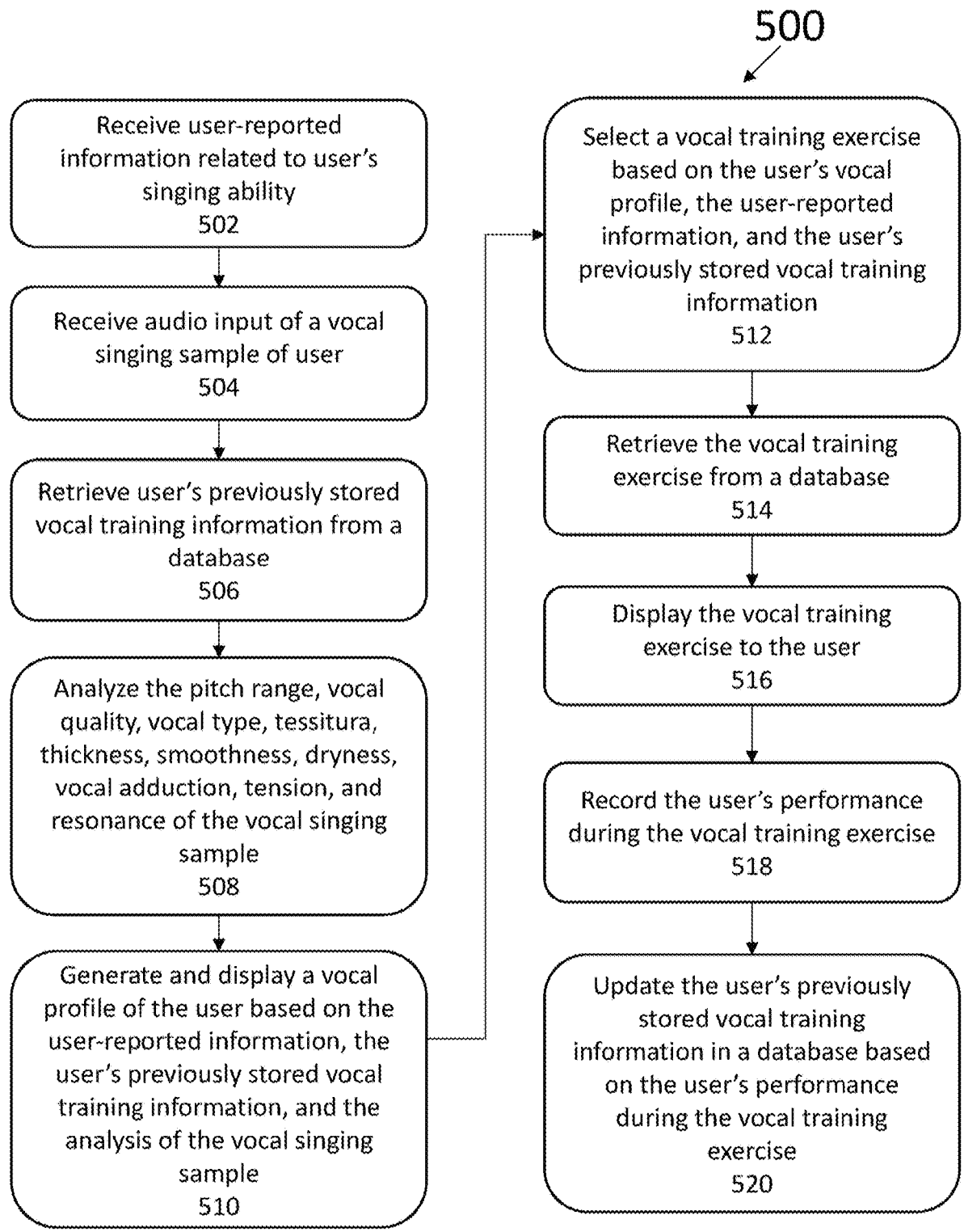
FIG. 5 is a flow diagram illustrating an exemplary method of operation for analyzing a vocal singing sample and delivering a vocal lesson to a user based on that analysis.

FIG. 5 is a flow diagram illustrating an exemplary method of operation 500 for analyzing a vocal singing sample and delivering a vocal lesson to a user based on that analysis. Method 500 may be described with reference to FIG. 1. The order in which method 500 is described is not intended to be construed as a limitation, and any number of the described method blocks can be combined in any order to implement method 500. Each of the operations and blocks may be optional and do not necessarily have to be implemented. Furthermore, method 500 can be implemented in any suitable hardware, software, firmware, or combination thereof.

In 502, a system receives user-reported information related to user's singing ability. This information can include any of the information described above as being collected by data collection unit 106. A user generally provides this information through a user interface akin to that described as part of front-end interaction module 114.

In 504, the system receives audio input of a vocal singing sample of the user. This is a sample that the user would like analyzed so that the user can receive feedback and training through the system. A user generally provides this audio input through a user interface akin to that described as part of front-end interaction module 114.

In 506, the system retrieves the user's previously stored vocal training information from a database. If this is the first time a user has interacted with the system, then there will not be any previously stored vocal training information to retrieve.

In 508, the system analyzes the pitch range, vocal quality, vocal type, tessitura, thickness, smoothness, dryness, vocal adduction, tension, and resonance of the vocal singing sample. By analyzing all these factors, the system develops a deep understanding of the user's voice and singing ability, which will allow the system to provide training for the user.

In 510, the system generates and displays to the user a vocal profile of the user based on the user-reported information, the user's previously stored vocal training information, and the analysis of the vocal singing sample. This vocal profile includes an assessment of the user's vocal range, vocal quality, and vocal age. This is information that the user would likely only otherwise be able to get from a very experienced vocal coach.

In 512, the system selects a vocal training exercise based on the user's vocal profile, the user-reported information, and the user's previously stored vocal training information. From the vocal profile, system 100 has an assessment of the user's current vocal level and vocal abilities. From the user-reported information, the system knows the user's vocal training goals. The system selects training exercises that it has determined will help the user reach those training goals based on the current state of the user's voice.

In 514, the system retrieves the vocal training exercise it selected from a database and then displays the vocal training exercise to the user in 516. This database can be the same database with the previously stored vocal training information, or it can be a separate database. The system generally displays the vocal training exercise to the user through a user interface akin to that described as part of front-end interaction module 114.

In 518, while the user is practicing the training exercise, the system records the user's performance. Then, in 520, the system updates the user's previously stored vocal training information in a database based on the user's performance during the vocal training exercise.

In order to fully appreciate the system, the user should interact with the system on a repeated basis, thereby allowing the completion of method 500 numerous times. In this way, the user will receive training from the system until the user has reached or achieved the user's stated goals.

Figure 6:
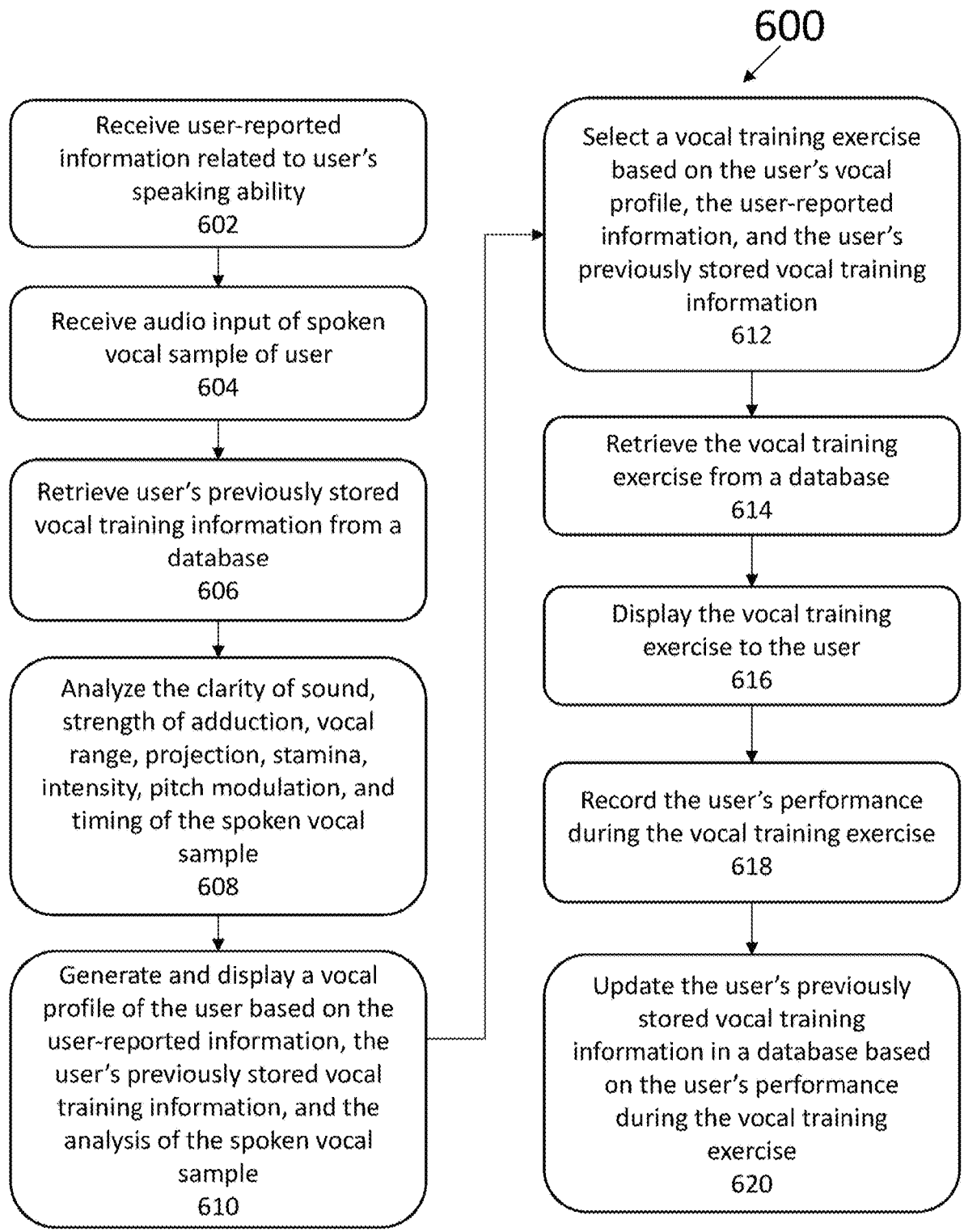
FIG. 6 is a flow diagram illustrating an exemplary method of operation for analyzing a spoken vocal sample and delivering a vocal lesson to a user based on that analysis.

FIG. 6 is a flow diagram illustrating an exemplary method of operation 600 for analyzing a spoken vocal sample and delivering a vocal lesson to a user based on that analysis. Method 600 may be described with reference to FIG. 1. The order in which method 600 is described is not intended to be construed as a limitation, and any number of the described method blocks can be combined in any order to implement method 600. Each of the operations and blocks may be optional and do not necessarily have to be implemented. Furthermore, method 600 can be implemented in any suitable hardware, software, firmware, or combination thereof.

In 602, a system receives user-reported information related to user's speaking ability. This information can include any of the information described above as being collected by data collection unit 106. A user generally provides this information through a user interface akin to that described as part of front-end interaction module 114.

In 604, the system receives audio input of a spoken vocal sample of the user. This is a sample that the user would like analyzed so that the user can receive feedback and training through the system. A user generally provides this audio input through a user interface akin to that described as part of front-end interaction module 114.

In 606, the system retrieves the user's previously stored vocal training information from a database. If this is the first time a user has interacted with the system, then there will not be any previously stored vocal training information to retrieve.

In 608, the system analyzes the clarity of sound, strength of adduction, vocal range, projection, stamina, intensity, pitch modulation, and timing of the spoken vocal sample. By analyzing all of these factors, the system develops a deep understanding of the user's voice and speaking ability, which will allow the system to provide training for the user.

In 610, the system generates and displays to the user a vocal profile of the user based on the user-reported information, the user's previously stored vocal training information, and the analysis of the vocal singing sample. This vocal profile includes an assessment of the user's vocal quality and speaking ability. This is information that the user would likely only otherwise be able to get from a very experienced speech coach.

In 612, the system selects a vocal training exercise based on the user's vocal profile, the user-reported information, and the user's previously stored vocal training information. From the vocal profile, the system has an understanding of the user's current vocal level and vocal abilities. From the user-reported information, the system knows the user's vocal training goals. The system selects training exercises that it has assessed will help the user reach those training goals based on the current state of the user's voice.

In 614, the system retrieves the vocal training exercise it selected from a database and then displays the vocal training exercise to the user in 516. This database can be the same database with the previously stored vocal training information, or it can be a separate database. The system generally displays the vocal training exercise to the user through a user interface akin to that described as part of front-end interaction module 114.

In 618, while the user is practicing the training exercise, the system records the user's performance. Then, in 620, the system updates the user's previously stored vocal training information in a database based on the user's performance during the vocal training exercise.

In order to fully appreciate the system, the user should interact with the system on a repeated basis, thereby allowing the completion of method 600 numerous times. In this way, the user will receive training from the system until the user has achieved the user's stated goals.

Figure 7:
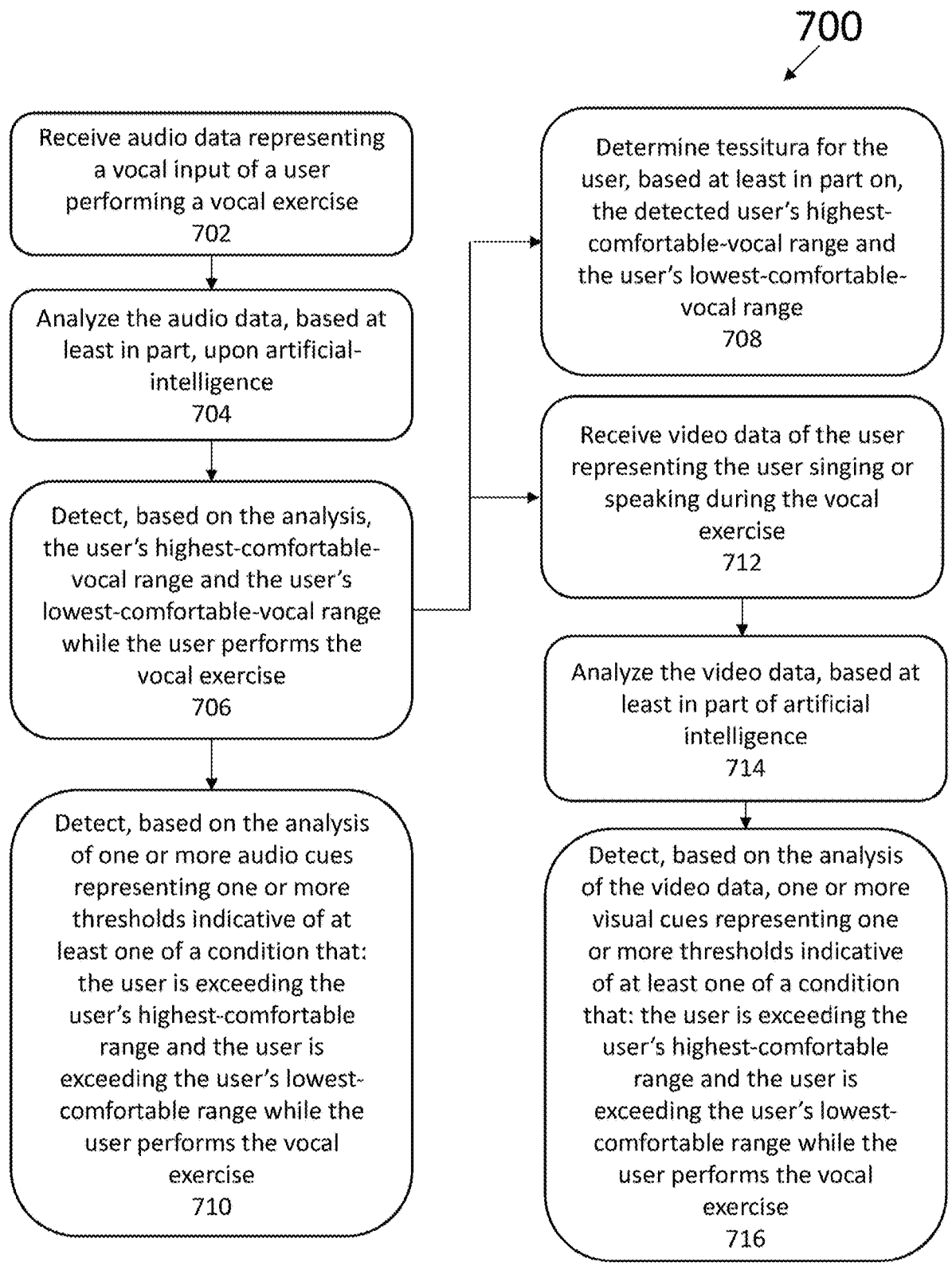
FIG. 7 is a flow diagram illustrating an exemplary method of operation for analyzing a user's vocal-comfort zone and determining whether the user's singing or speaking is within the user's comfort zone during an exercise.

FIG. 7 is a flow diagram illustrating an exemplary method of operation for analyzing a user's vocal comfort zone and determining whether the user's singing or spoken voice is within the user's comfort zone during an exercise.

Method 700 may be described with reference to FIG. 1. The order in which method 700 is described is not intended to be construed as a limitation, and any number of the described method blocks can be combined in any order to implement method 700. Each of the operations and blocks may be optional and do not necessarily have to be implemented. Furthermore, method 700 can be implemented in any suitable hardware, software, firmware, or combination thereof.

In 702, a system receives audio data representing a vocal input of a user performing a vocal exercise. A user generally provides this information through a user interface akin to that described as part of front-end interaction module 114.

Then, in 704, the system analyzes the audio data, based at least in part, upon artificial intelligence. This artificial intelligence can use a number of data analysis tools including but not limited to machine learning, artificial neural network or deep learning.

Afterwards, in 706, the system detects, based on the analysis, the user's highest-comfortable-vocal range and the user's lowest-comfortable-vocal range while the user performs the vocal exercise. Here, the user's highest-comfortable-vocal range represents a highest-vocal boundary of the user, in which the user can comfortably sing or speak, and the lowest-comfortable-vocal range represents a lowest-vocal boundary of the user, in which the user can comfortably sing or speak. By definition, the user's highest-comfortable-vocal range is below the user's highest-achievable-vocal range, and the user's lowest-comfortable-vocal range is above the user's lowest-achievable-vocal range.

Additionally, as shown in 708, the system can determine the tessitura for the user, based at least in part on, the detected user's highest-comfortable-vocal range and the user's lowest-comfortable-vocal range.

After the system establishes the user's highest-comfortable-vocal range and the user's lowest-comfortable-vocal range, as shown in 710, the system can detect, based on the analysis of one or more audio cues representing one or more thresholds indicative of at least one of a condition that: the user is exceeding the user's highest-comfortable range and the user is exceeding the user's lowest-comfortable range while the user performs the vocal exercise. These cues are generally indicative of discomfort on the part of the user.

In addition to analyzing audio signals, as shown in 712, the system can analyze video wherein the system receives video data of the user representing the user singing or speaking during the vocal exercise. This video data includes, at least in part, video data representing a portion of the user's face while the user performs the vocal exercise, because the facial expression of the user is necessary for this analysis.

Then, in 714, the system analyzes the video data, based at least in part of artificial intelligence. Again, this artificial intelligence can use a number of data analysis tools including but not limited to machine learning, artificial neural networks or deep learning.

Finally, in 716, the system detects, based on the analysis of the video data, one or more visual cues representing one or more thresholds indicative of at least one of a condition that: the user is exceeding the user's highest-comfortable range and the user is exceeding the user's lowest-comfortable range while the user performs the vocal exercise. These visual cues are generally related to the user's facial expression during the vocal exercise.

If the system 100 detects during method 100 that the user has exceeded the user's highest-comfortable range and/or the user has exceeded the user's lowest-comfortable range while the user performs a vocal exercise, then system can respond in several ways. In a first example, the system can simply record this data as an update to the user's vocal profile. In a second example, system 100 can modify the vocal exercise as the user is performing his or her lesson in order to either bring the vocal exercise back within the user's comfort range or push the user further outside of their comfort range. In a third example, system 100 can modify future vocal exercises to ensure that vocal exercises fall within the user's comfort zone, or oppositely, to push the user further outside of their comfort range. In all three examples, system 100 can provide the user with coaching during (in real-time) or after the vocal exercise is completed in response to the user exceeding their vocal-comfortable range.

System 100, and/or method 700 (or other combination of method steps and operations described in this application), may rely on a plurality of AI cues to score audio, video, and/or other media in order to assess a user's vocal comfort, proficiency, and ongoing vocal development. These cues may include one or more of the following:

1. Posture—scoring ribcage placement and level of tension in spine, shoulders, neck, and jaw, as well as scoring any unnecessary movement in these regions in the body.
2. Breathing exercises—scoring placement of hands, eye motions, resistance at the mouth, timing of the breath, volume of sound produced during the exercise.
3. Tongue exercises—scoring the placement of the tongue, rate of movements, any unnecessary jaw motion.
4. Humming exercises—scoring the degree of pitch "smear" or glissando used between notes, the level of tension in the sound of the voice, amount of resonance in the voice, scoring pattern recognition for jaw placement and movement to score the release motions used between patterns.
5. Syllables—scoring mouth, tongue and jaw physical placement for vowels and consonants, as well as scoring each vowel for resonance, clarity, and strong fundamental pitch when compared with user baseline collected in vocal profile.
6. "Speaky Voice" exercises—scores to predict vocal cord adduction (training AI to score vocal qualities such as clarity, strength, breathiness, etc), intensity, volume level, resonance when compared with user baseline.
7. Measuring Vocal Profile (including vocal comfort zone)—(to be used in alone or in combination with user-reported and mechanically-assessed data)
    a. Cues for AI scoring to measure lowest comfortable vs. lowest possible video ord highest comfortable vs highest possible notes would include scores to predict vocal cord adduction (training AI to score vocal qualities such as clarity, strength, breathiness and other qualities), relative strength of the fundamental pitch being sung, tension level in the throat neck and jaw (for example can be seen as rippling on the throat or as a flexing of the mandibular muscle in a video, or heard as a pinched or tight quality with a loss of resonance in audio recordings), and unnecessary movements in these areas.
8. Assessment of singing ability, proficiency, ongoing vocal development, and progress toward meeting core vocal goals for singing (includes but not limited to):
    a. Assessment of breathing technique can be determined by an AI trained to score airiness, degree of breathlessness, fading at ends of phrases, and length of audible breaths. Breathing intervals and predicted air volume moved by the user can be measured scoring the degree of mouth, jaw and chest motion via pattern recognition of video.
    b. Prediction of vocal cord adduction can be assessed by training AI to score vocal qualities such as clarity, strength, intensity, breathiness, etc., scoring other elements such as relative strength of the fundamental pitch being sung, tension level in the throat, neck, and jaw (for example rippling on the throat or flexing of the mandibular muscle may be detected in a video, or detected in audio file as a pinched or tight quality with a loss of resonance), and unnecessary movements in these areas.
    c. AI prediction of vocal expressiveness can be assessed by scoring vocal qualities detected in audio such as dynamic range (loud-soft), relative proximity to the ideal vowel placement for that singer, and variation in vocal timbre (sound quality). Lack of vocal tension is again a predictor of maximal vocal expressiveness, so AI scoring of video for tension level in the throat neck and jaw (for example can be seen as rippling on the throat or as a flexing of the mandibular muscle in a video, or heard as a pinched or tight quality with a loss of resonance in audio recordings), and unnecessary movements in these areas is also important.
    d. Because proper jaw placement and relaxation has such a fundamental effect on the ability of the voice to carry emotion, AI prediction of resonance, projection and vocal clarity may also be predicted with scoring pattern recognition of video for jaw placement and degree of jaw motion from the ideal positioning, when compared with the user baseline position.
    e. Diction-specific elements (vowel and/or consonant placement in combination with pitch modification) may be scored from audio or video recordings by AI (alone or in combination with user-reported or mechanically-assessed data and algorithms) such as rolled Italian "r", Spanish lisped "th," German u vowel, etc. This feature in combination with user-reported goals and algorithms for desired diction in various languages can help a user train specifically for any language offered by the embodiment of the invention.
    f. Stylistic elements may be scored from audio or recordings by AI (alone or in combination with user-reported or mechanically-assessed data and algorithms) and predict such specific genre-related elements such as quality of runs in R&B, appropriateness of length and variation of scatted sections in Jazz songs, modifications to vowels for pop, rock or country, varied harmonies in gospel, or diction in music theater styles, for example.
9. Assessment of speaking ability, proficiency, ongoing vocal development, and progress toward meeting core vocal goals for speaking:
    Cues for AI scoring to measure the following qualities:
    The same qualities that are important for singing are also important for speakers, as it all relates to the development and best practices for the voice. All items in number 8 above, may be applicable for speakers as well, including vocal adduction, which is at the core of vocal health, projection, and stamina.
    Further speech-specific AI cues include but are not necessarily limited to:
    a. Pitch—finding the optimal baseline of the user's speaking voice would require AI-assessment alone or in combination with user-reported or mechanically-assessed data streams. AI scoring can recognize vocal adduction during speech at various pitch levels to predict the healthiest and most comfortable spot for a voice to center on. In the speaking comfort range, a voice will have a much easier time operating loudly or for longer periods of time (stamina).
   b. Rate of Speech—An optimal speech rate can be predicted for various types of performance situations and for various levels of technicality based on AI scoring of (alone or in combination with user-reported or mechanically-assessed data and algorithms) diction (vowel and consonant placement and intensity), understandability, word density, length and frequency of pauses.
   c. Emphasis—Degree of vocal energy and interest generated can be predicted by AI scoring of (alone or in combination with user-reported or mechanically-assessed data and algorithms) the following 3 attributes of vocal emphasis: variations in loudness, variations in syllable length, and variations in pitch.
   d. Level of certainty in vocal delivery can be predicted by AI scoring of (alone or in combination with user-reported or mechanically-assessed data and algorithms)—change in pitch high to low at the end of a sentence, pitch change high to low. Some examples of when a user would want to sound very certain: a doctor giving a patient a difficult diagnosis, a financial executive being deposed by a lawyer. In these situations, the user does not want to be questioned.
   e. Level of uncertainty can be predicted by AI scoring of (alone or in combination with user-reported or mechanically-assessed data and algorithms)—change in pitch low to high at the end of a sentence. Some examples of when a user wants to sound less certain: someone asking a question, a radio personality inviting another speaker to share in an interview, an executive running a meeting asking for input on a solution in a brainstorming session with a team. In these situations, the user wants to generate curiosity or interest, or create an open or inviting conversation.
   f. Melody—Pitch variation can be predicted by AI scoring (alone or in combination with user-reported or mechanically-assessed data and algorithms) of melody or variations in pitch over larger phrase regions, which may be scored separately from more localized pitch variations in the creation of emphasis for an additional layer of energy and interest in the sound of a voice.
   g. Connectedness and Resonance—Level of tonal support can be predicted by AI scoring of (alone or in combination with user-reported or mechanically-assessed data and algorithms) connectedness, vowel placement, resonance, and tone.
   h. Diction-specific elements (vowel and/or consonant placement in combination with pitch modification) can be scored from audio recordings by AI (alone or in combination with user-reported or mechanically-assessed data and algorithms) such as a "leaky s", lisped "th", rolled Italian "r", Mandarin tones up and down on vowels, etc. This feature in combination with user-reported goals and algorithms for desired diction in various languages can help a user train specifically to fix speech impediments, reduce regional or foreign language accent, or to train their accent in any language the embodiment of the invention offers to perfection.

Feedback and Coaching

The assessments made by system 100 when a user performs voice exercises, create feedback in real time, over the course of lessons, in the form of lessons or drills, and forms the basis for a long-term strategy to help the user achieve his vocal development goals. Feedback can be produced in real-time for the singer as comments corrections the singer can use in real time, such as reminding the singer to breathe deeper, release tension, or drop the jaw, for example. If the system detects too many areas to work on, it will prioritize the most important. It will then teach specific techniques over the course of one or more lessons in order to help the user develop skills and techniques over a longer-term process. It may create unique drills to help the user achieve those goals over time with practice. The overall goals of the vocal work will thus be determined by this feedback over time. Thus, the timeline for feedback can function on any combination of immediate, short term, or longer-term-strategic levels.

Put differently, there is a higher executive function to innovative system 100 than current-existing systems. Until the advent of system 100, current systems are generally limited to reading a student's overall range and minimally providing the student exercises to help the student expand the student's range. In contrast, system 100 solves many of limitations associated with current systems, by permitting a user to richly expand the user's voice techniques in multiple areas (such as pitch, rhythm, breathing, adduction, resonance, expressiveness, dynamics, diction, genre-specific or stylistic techniques, etc.) and then more importantly, help the user coordinate proper use of multiple techniques simultaneously the way that a real-vocal coach would.

For example, the system can help the singer coordinate multiple techniques with real-time reminders during performances, such as "Oops, you forgot to take a breath there, remember to take deeper breaths" and in the same song, "Watch your vowel here, it should be "ah" or "you're going a little flat at the end of this phrase . . . . Let's give you an exercise to get you on track right there."

Some of this feedback might be given in a report later to help the user really understand what's going wrong. System 100 may create a strategy to correct the issues. System 100 may produce customized drills of the notes being missed for the user, it might play examples or clips of proper technique to demonstrate, it might give the user an entirely different lesson depending on the performance it analyzes.

Additionally, as appreciated by those skilled in the art after having the benefit of this disclosure that system 100 may be utilized to coach users to improve their voice for counterterrorism and related applications.

For instance, in a tactical hostage rescue operation aspect, commanders and their team involved in hostage rescue operations require the ability to endure sustained and intense demands on their voices. It is one of the tools of their trade.

The innovative system and method, such as example system 100, can help users train range, strength, teach knowledge of their comfort zone to operate in without straining their voice, and train to expand the capabilities of their voice, will give them an essential edge in a demanding situation. For international military-type hostage rescue, if they experience a denial of radio communications service from jamming or a failure of equipment, the demands on their voices to communicate in a short and intense situation will go up. If their radios go out, they must be heard by their teammates or the hostage taker, if so desired, even if they are in a narrow hallway, shouting over gunfire, or making demands of the hostage taker. The training in vocal comfort zone and strength offered by the invention will serve in these situations.

In an espionage field operations aspect, system 100 can assist intelligence agents working in the field who are required to use their voice to engage with and solicit local sources of intelligence. The techniques in the invention to assess and train vocal strength, range, accent reduction, posture and modulation will often result in improved conveyance of traits of authority, warmth, magnetism, trustworthiness, and reduction of fear. Espionage requires in part a development of performance technique and behaving in a certain way. Thus, these techniques can be an important tool in the box of the field operator.

In a counterterrorist training aspect, system 100 can assist a user develop voice techniques to better carry out an operation. Operational training requires that the trainer use their voices for the duration of the training to teach, convey feedback, praise and admonish. The techniques offered by the invention to create sustained vocal strength, modulation, and health will result in a more successful training session than a trainer with a weak, hoarse, unhealthy, or non-authoritative voice.

In yet another aspect, system 100 may operate in a coaching mode in which system coordinates multiple techniques into one. System 100 is able to receive multiple real-time information, Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

The invention claimed is:

1. A computer-implemented method, comprising:
   receiving audio data representing a vocal input of a user performing a vocal exercise;
   analyzing the audio data, based at least in part, upon artificial intelligence; and
   detecting, based on the analysis, the user's highest-comfortable-vocal range and the user's lowest-comfortable-vocal range while the user performs the vocal exercise; wherein the user's highest-comfortable-vocal range represents a highest-vocal boundary of the user, in which the user can comfortably sing or speak, and wherein the lowest-comfortable-vocal range represents a lowest-vocal boundary of the user, in which the user can comfortably sing or speak, wherein the user's highest-comfortable-vocal range is below the user's highest-achievable-vocal range, and the user's lowest-comfortable-vocal range is above the user's lowest-achievable-vocal range.

2. The computer-implemented method as recited in claim 1, wherein the user's highest-comfortable-vocal range includes at least one of a highest-comfortable pitch, a highest-comfortable-full-voiced pitch, a highest-comfortable note, and a highest-comfortable-belted pitch.

3. The computer-implemented method as recited in claim 1, wherein the user's lowest-comfortable-vocal range includes at least one of a lowest-comfortable pitch, and a lowest-head-register pitch, a highest-comfortable note, and a highest-comfortable-belted pitch.

4. The computer-implemented method as recited in claim 1, further comprising determining tessitura for the user, based at least in part on, the detected user's highest-comfortable-vocal range and the user's lowest-comfortable-vocal range.

5. The computer-implemented method as recited in claim 1, further comprising:
   receiving video data of the user representing the user singing or speaking during the vocal exercise, wherein the video data includes, at least in part, video data representing a portion of the user's face while the user performs the vocal exercise;
   analyzing the video data, based at least in part of artificial intelligence; and
   detecting, based on the analysis, one or more visual cues representing one or more thresholds indicative of at least one of a condition that: the user is exceeding the user's highest-comfortable range and the user is exceeding the user's lowest-comfortable range while the user performs the vocal exercise.

6. The computer-implemented method as recited in claim 1, further comprising:
   detecting, based on the analysis of one or more audio cues representing one or more thresholds indicative of at least one of a condition that: the user is exceeding the user's highest-comfortable range and the user is exceeding the user's lowest-comfortable range while the user performs the vocal exercise.

* * * * *